US010676207B2

(12) United States Patent
Guerquin

(10) Patent No.: US 10,676,207 B2
(45) Date of Patent: Jun. 9, 2020

(54) APPARATUS TO STORE A DROGUE HOSE ON AN AIRCRAFT

(71) Applicant: The Boeing Company, Chicago, IL (US)

(72) Inventor: Kris Guerquin, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 702 days.

(21) Appl. No.: 15/146,404

(22) Filed: May 4, 2016

(65) Prior Publication Data
US 2017/0275016 A1  Sep. 28, 2017

Related U.S. Application Data
(63) Continuation-in-part of application No. 15/082,736, filed on Mar. 28, 2016.

(51) Int. Cl.
B64D 39/02 (2006.01)
B65H 75/44 (2006.01)

(52) U.S. Cl.
CPC ......... *B64D 39/02* (2013.01); *B65H 75/4402* (2013.01); *B65H 75/4415* (2013.01); *B65H 75/4478* (2013.01); *B65H 2701/33* (2013.01)

(58) Field of Classification Search
CPC ........ B64D 39/02; B64D 39/00; B64D 39/04; B65H 75/4415; B65H 75/4478; B65H 75/4402; B65H 75/4457; B65H 75/4447; B65H 75/40; B65H 75/4489; B65H 75/4442; B65H 75/44; B65H 75/4471; B65H 75/4452; B65H 2701/33; B65H 51/20; B65H 49/00; B60S 5/04; B60P 3/2265; H01F 41/09; H01F 41/082; H01F 41/06
USPC ...................................... 244/135 A
See application file for complete search history.

(56) References Cited

U.S. PATENT DOCUMENTS 2,595,655 A * 5/1952 Hannay ................. B65H 75/38
                                                      137/355.2
2,599,423 A * 6/1952 Ziegler ..................... B64F 1/28
                                                      242/390.8
2,973,171 A * 2/1961 Ward ..................... B64D 39/02
                                                      244/135 A (Continued)

OTHER PUBLICATIONS

The United States Patent and Trademark Office, "Final Office Action," issued in connection with U.S. Appl. No. 15/082,736, dated Nov. 29, 2018, 17 pages.

(Continued)

Primary Examiner — Medhat Badawi
Assistant Examiner — Vicente Rodriguez
(74) Attorney, Agent, or Firm — Hanley, Flight & Zimmerman, LLC

(57) ABSTRACT

Apparatus to store a drogue hose on an aircraft are disclosed herein. An example apparatus includes a drum to rotate in a first direction to coil a hose and a second direction to uncoil the hose, a carriage at least partially surrounding the drum, the carriage including rollers to guide the hose as the hose is coiled and uncoiled, the carriage having an outer surface covering the rollers and wheels coupled to the carriage, the wheels to facilitate movement of the carriage along a length of the drum as the drum rotates.

19 Claims, 22 Drawing Sheets

(56) References Cited

U.S. PATENT DOCUMENTS

| | | | |
|---|---|---|---|
| 4,534,384 A * | 8/1985 | Graham | B64D 39/02 |
| | | | 137/355.2 |
| 4,655,399 A | 4/1987 | Harvey | |
| 5,141,178 A | 8/1992 | Alden et al. | |
| 5,573,226 A | 11/1996 | Smith | |
| 5,961,079 A | 10/1999 | Jonsson | |
| 8,517,348 B2 * | 8/2013 | Smith | B66D 3/18 |
| | | | 254/385 |
| 2006/0273213 A1 | 12/2006 | Turk et al. | |
| 2010/0320304 A1 * | 12/2010 | Iguchi | B65H 75/38 |
| | | | 242/388.91 |
| 2011/0193037 A1 * | 8/2011 | Smith | B66D 3/18 |
| | | | 254/336 |
| 2012/0025002 A1 * | 2/2012 | Zink | B65H 75/403 |
| | | | 242/390.2 |
| 2014/0034887 A1 * | 2/2014 | Fetters, III | B66D 1/28 |
| | | | 254/266 |
| 2017/0275015 A1 | 9/2017 | Guerquin | |

OTHER PUBLICATIONS

United States Patent and Trademark Office, "Non-Final Office Action", issued in connection with U.S. Appl. No. 15/082,736, dated Dec. 28, 2017, 31 pages.

The United States Patent and Trademark Office, "Non-Final Office Action," issued in connection with U.S. Appl. No. 15/082,736, dated Jul. 30, 2019, 8 pages.

The United States Patent and Trademark Office, "Notice of Allowance," issued in connection with U.S. Appl. No. 15/082,736, dated Dec. 23, 2019, 8 pages.

\* cited by examiner

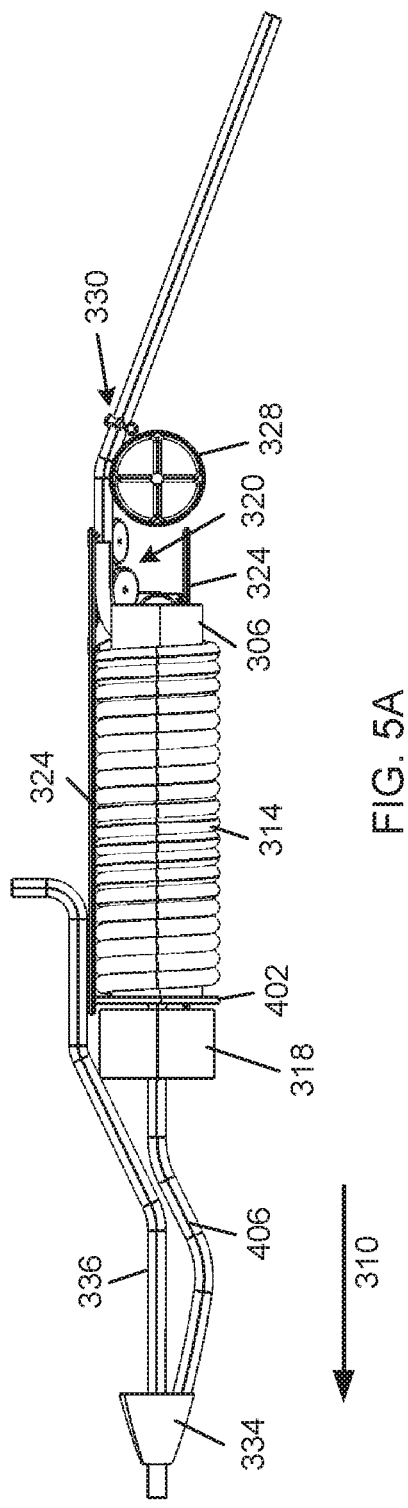
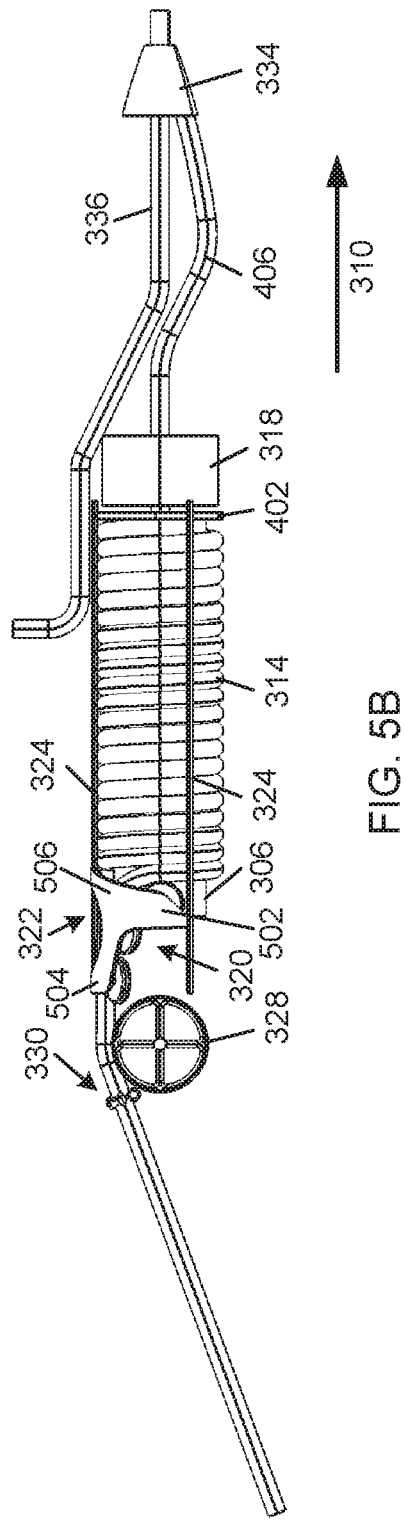
FIG. 5A
FIG. 5B

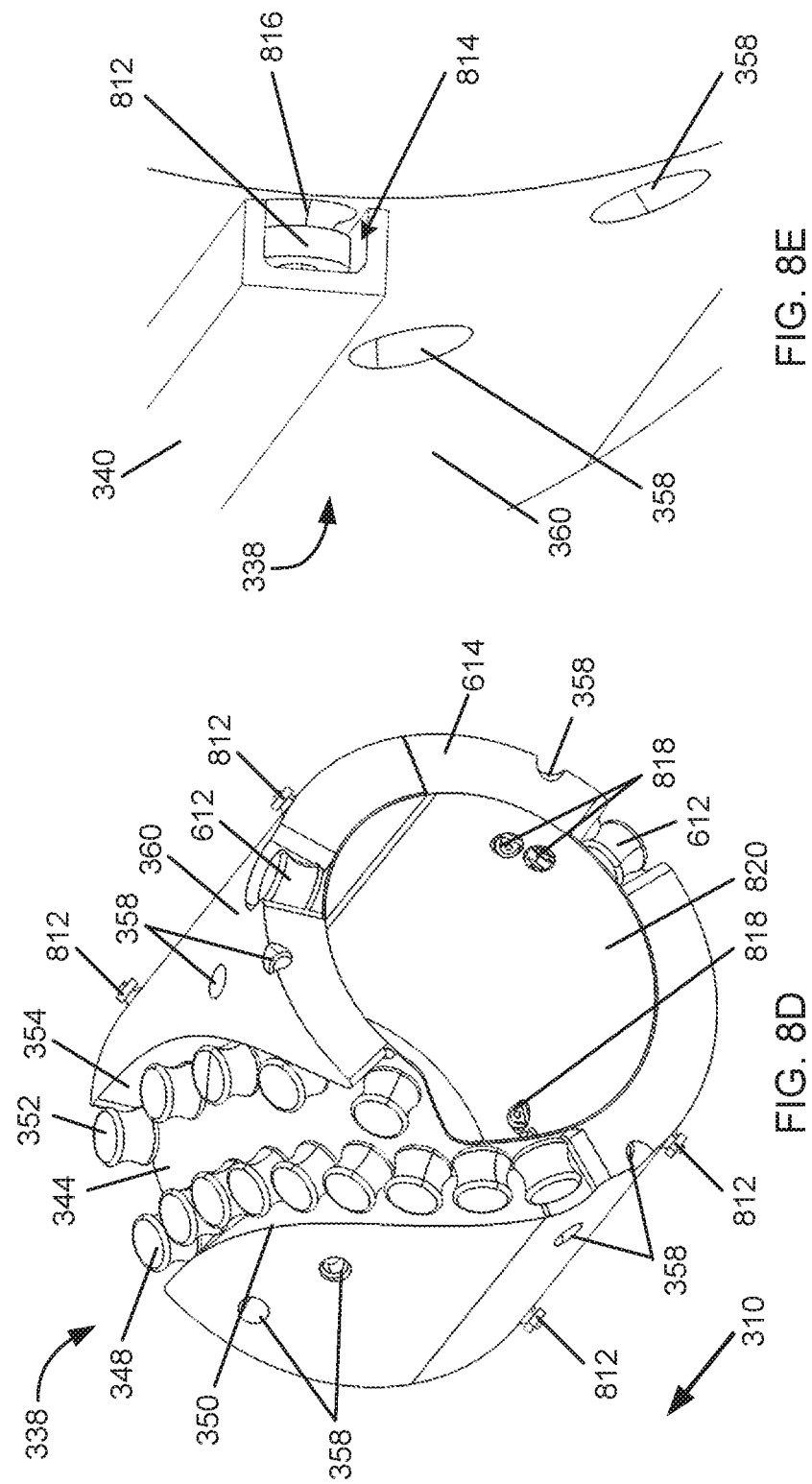

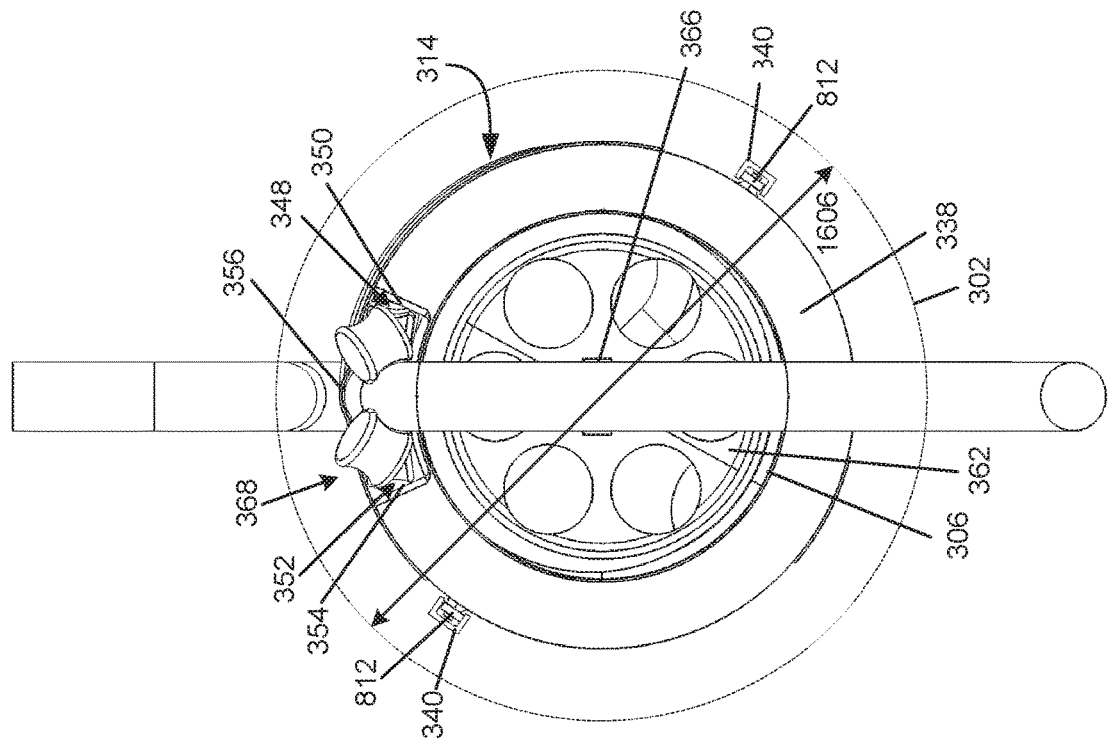
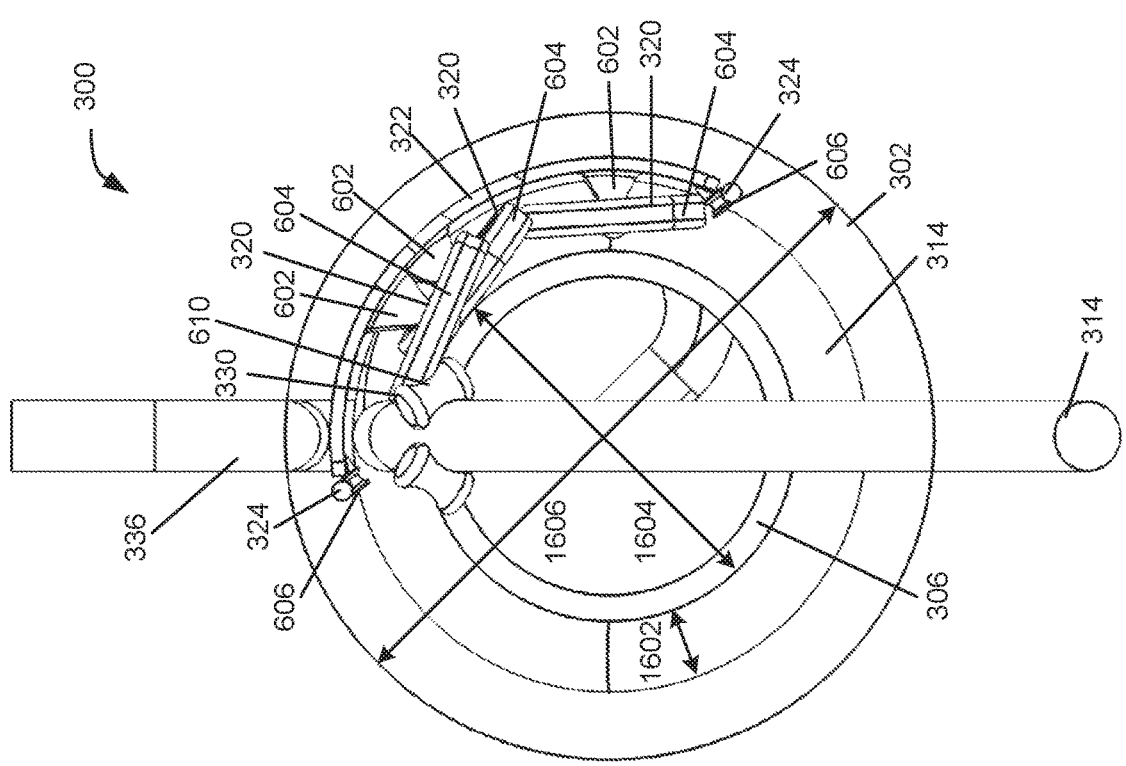

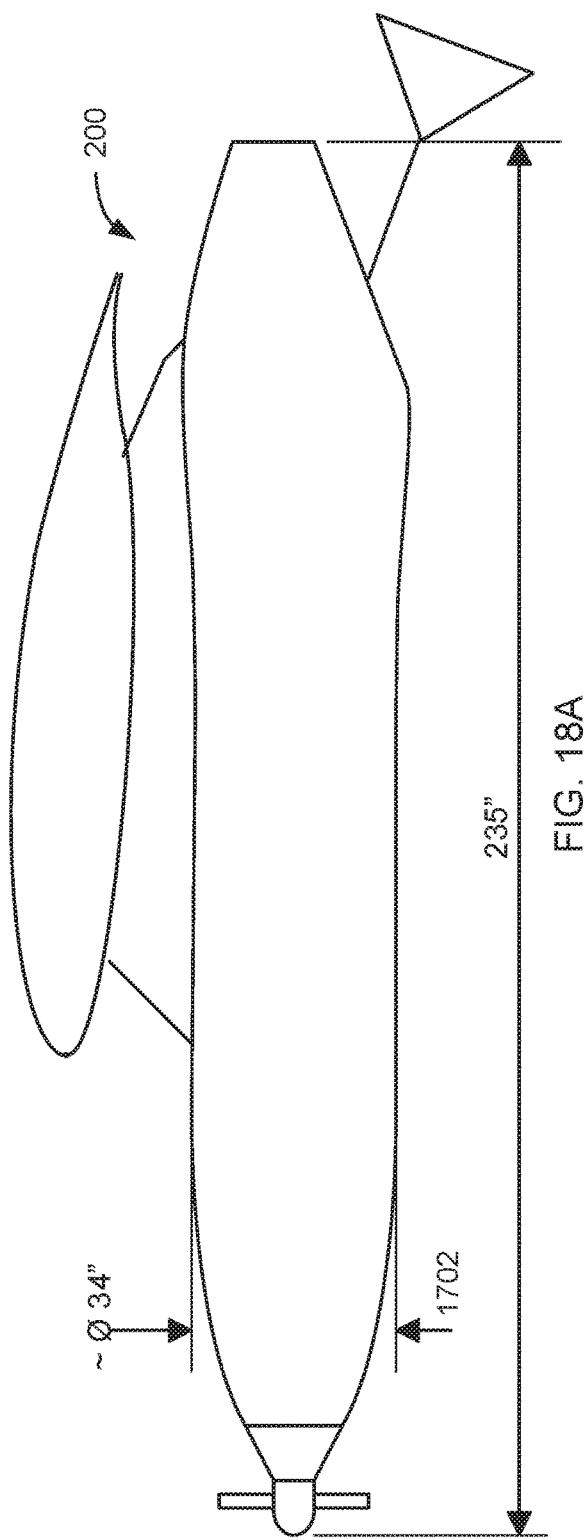
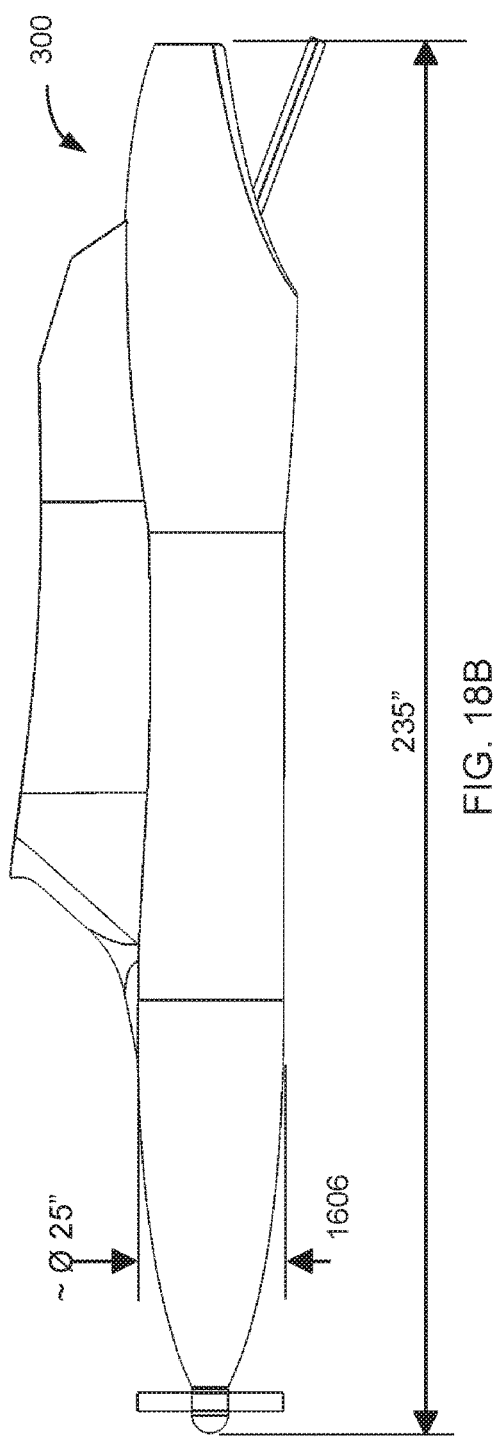
FIG. 18A (PRIOR ART)
FIG. 18B

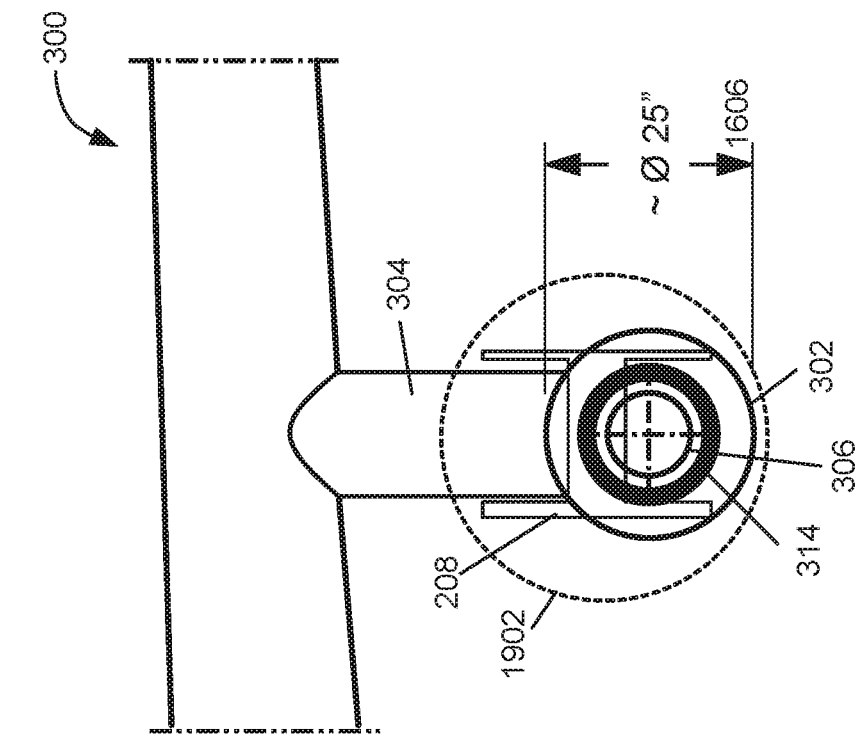
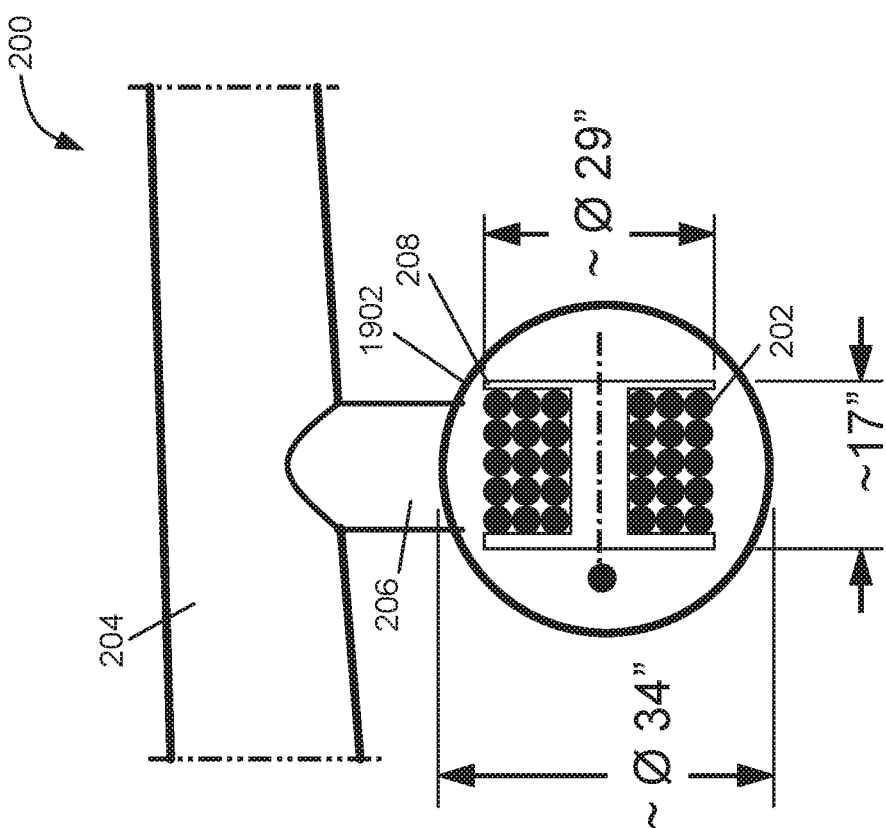
FIG. 19B
FIG. 19A (PRIOR ART)

APPARATUS TO STORE A DROGUE HOSE ON AN AIRCRAFT

RELATED APPLICATION

This patent arises from a continuation-in-part of U.S. application Ser. No. 15/082,736, entitled "APPARATUS TO STORE A DROGUE HOSE ON AN AIRCRAFT", which was filed on Mar. 28, 2016 and is hereby incorporated herein by reference in its entirety.

FIELD OF THE DISCLOSURE

This disclosure relates generally to drogue hoses and, more particularly, to apparatus to store a drogue hose on an aircraft.

BACKGROUND

Drogue hoses and chutes are used in aircraft, such as a tanker aircraft, for in-flight refueling of a second aircraft. Drogue hoses and chutes are typically disposed in refueling pods attached under the wings of the tanker aircraft. In some applications, such as buddy-buddy refueling, a refueling pod may be attached to a first small aircraft to refuel another small aircraft.

SUMMARY

An example apparatus includes a drum to rotate in a first direction to coil a hose and a second direction to uncoil the hose, a carriage at least partially surrounding the drum, the carriage including rollers to guide the hose as the hose is coiled and uncoiled, the carriage having an outer surface covering the rollers and wheels coupled to the carriage, the wheels to facilitate movement of the carriage along a length of the drum as the drum rotates.

Another example apparatus includes a drum positioned in a refueling pod, a drogue hose to be coiled around the drum when the drum is rotated in a first direction, the drogue hose to be uncoiled when the drum is rotated in the second direction, and a guide to move along the length of the drum as the drum rotates in the first and second directions, a channel formed in the guide through which the drogue hose is disposed, the guide including rollers to tightly coil the drogue hose around the drum.

Yet another example apparatus includes a carriage to guide a drogue hose, the carriage including a channel through which the drogue hose moves, rollers disposed in the channel, the rollers freely rotating as the drogue hose moves through the channel, and wheels disposed in apertures of the carriage, the wheels extending from an interior surface of the carriage to guide the carriage.

BRIEF DESCRIPTION OF THE DRAWINGS

FIGS. 5A and 5B are side views of example apparatus disposed within the example refueling pods disclosed herein.

FIGS. 8A-8E are detailed views of the example guiding apparatus disclosed herein.

FIGS. 16A and 16B are rear views of the example refueling pods disclosed herein.

FIGS. 18A and 18B are a side-by-side comparison of side views of the known refueling pod of FIG. 2 and the example refueling pods of FIGS. 3-17 disclosed herein.

FIGS. 19A and 19B are a side-by-side comparison of front views of the spool of the known refueling pod of FIG. 2 and the drum of the example refueling pods of FIGS. 3-17 disclosed herein.

The figures are not to scale. Wherever possible, the same reference numbers will be used throughout the drawing(s) and accompanying written description to refer to the same or like parts.

DETAILED DESCRIPTION

The apparatus disclosed herein may be used for in-flight refueling of an aircraft. More specifically, the apparatus described herein includes a refueling pod attached to the aircraft that stores a drogue hose and a drogue chute. The refueling pod may be attached under a wing or on the fuselage of the aircraft (e.g., a tanker aircraft) to enable transfer of fuel to another aircraft during flight.

In the example refueling pod described herein, the drogue hose is coiled around a rotating drum that is located in the refueling pod and has an axis of rotation aligned with the direction of flight. The drogue hose is guided by guides (e.g., pulleys or rollers) that move along the length of the drum as the drogue hose is coiled around the drum. The guides may be attached to a cart or carriage that moves (e.g., slides) along a track. The track may be coupled to an interior structure of the refueling pod or may be an integral part of the structure of the refueling pod. In some examples, the track may be permanently attached to the interior structure of the refueling pod and may be positioned adjacent the drum. The movement of the cart along the track is coordinated with (e.g., is synchronized with) a rotation of the drum to prevent slack in the drogue hose as the drogue hose is coiled around the drum. In some examples, an outer surface of the drum may include a helical groove that interfaces with wheels or rollers attached to the cart or carriage to facilitate synchronization of the rotation of the drum and the movement of the carriage. Additionally, one or more guiding wheels or rollers coupled to an interior structure or surface of the refueling pod adjacent an opening (e.g., a drogue chute cave) guide the drogue hose as the drogue hose moves through the opening.

Figure 1:
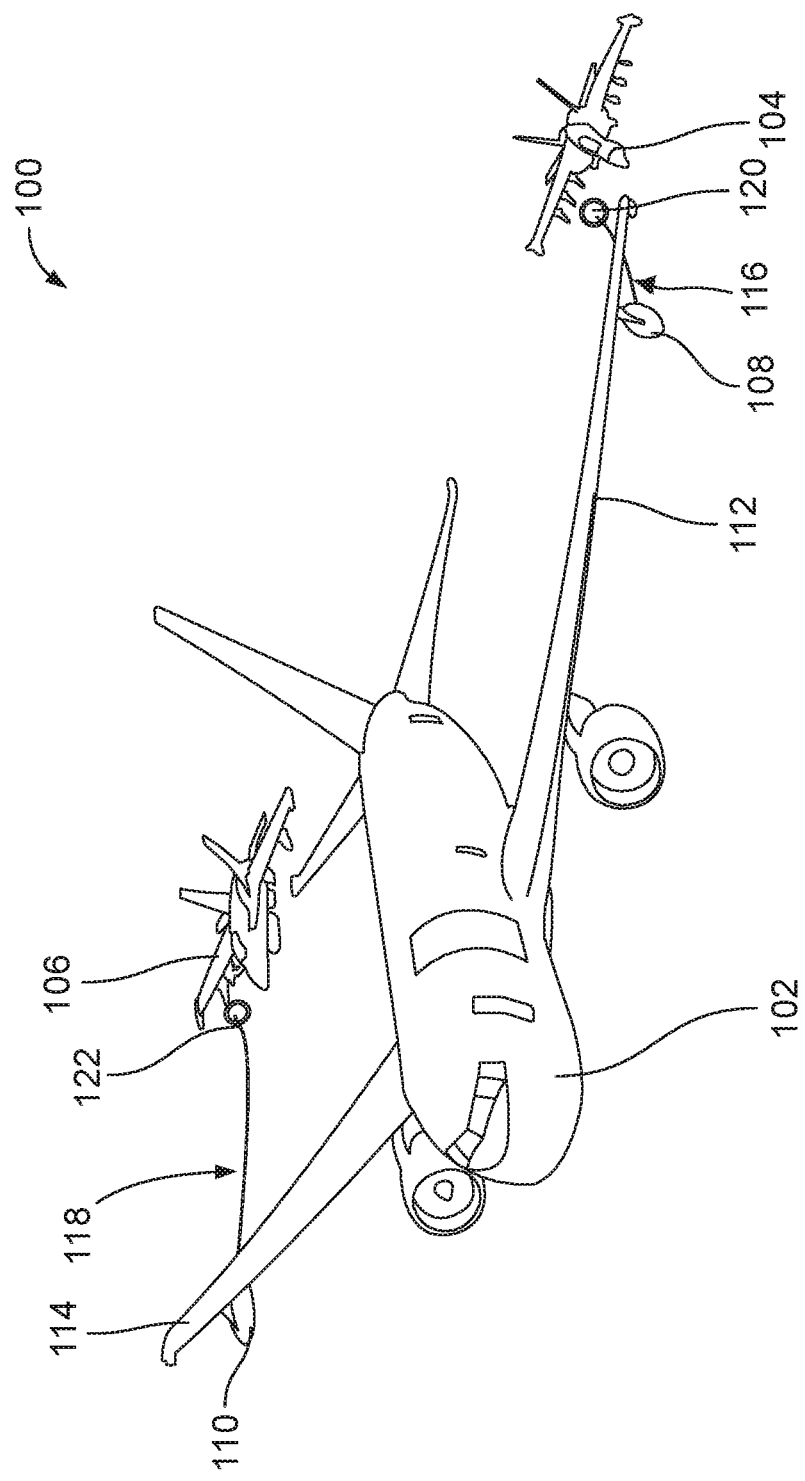
FIG. 1 represents an example environment in which the apparatus disclosed herein may be implemented.

FIG. 1 represents an example environment 100 in which the example apparatus disclosed herein may be implemented. The example environment 100 includes a tanker aircraft 102 that may be used to refuel one or more fighter jets 104, 106 by implementing a drogue-and-chute refueling operation during flight. The tanker aircraft 102 includes two under-wing refueling pods (e.g., wing aerial refueling pods (WARPs)) 108, 110 attached to respective wings 112, 114 of the tanker aircraft 102. Each of the example under-wing refueling pods 108, 110 includes a respective drogue hose 116, 118 and drogue chute 120, 122 to facilitate refueling of the fighter jets 104, 106. When not in use for refueling operations, the drogue hoses 116, 118 are stored in the respective under-wing refueling pods 108, 110. Alternatively, in other example environments, a refueling pod, similar to the under-wing refueling pods 108, 110, may be attached to the body of a first fighter jet (e.g., the fighter jet 104) to refuel a second fighter jet (e.g., the fighter jet 106) using a buddy-buddy type refueling operation. Buddy-buddy type refueling is particularly convenient for carrier-based aircraft.

Figure 2:
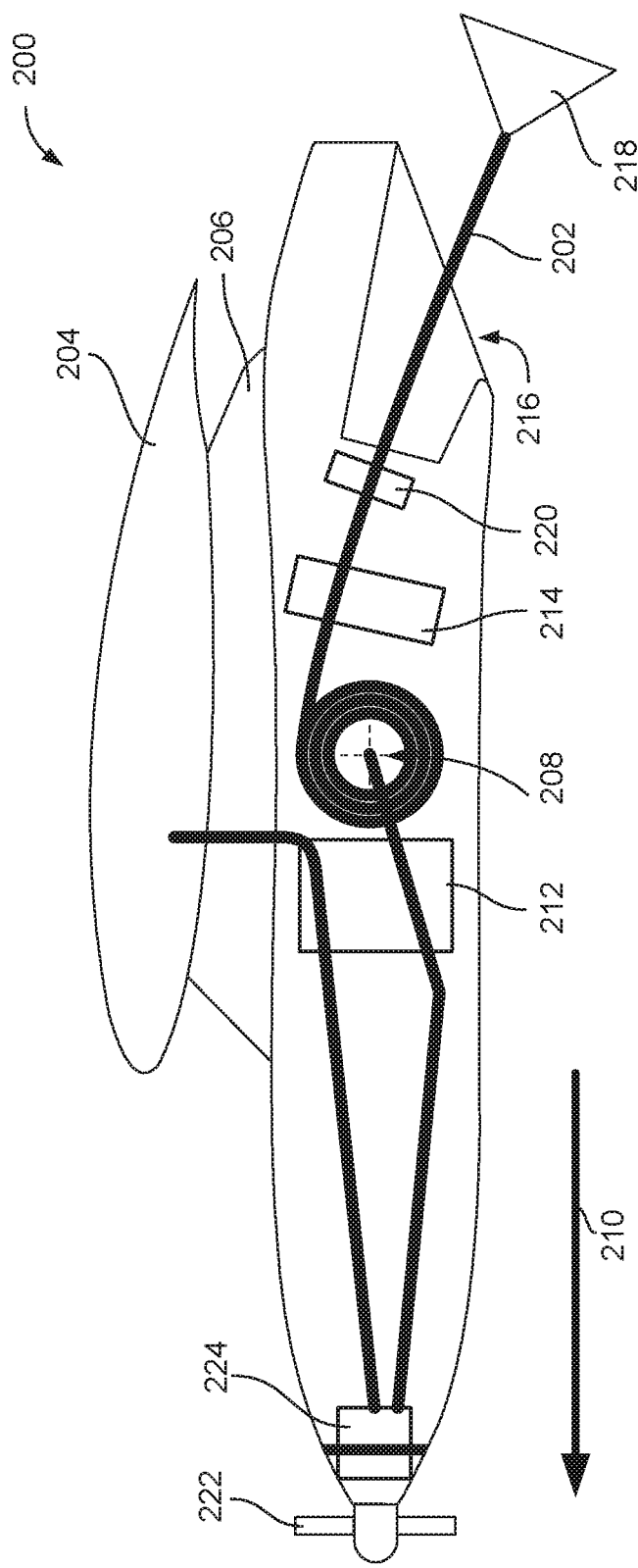
FIG. 2 is a diagram of a known refueling pod.

FIG. 2 is a diagram of a known refueling pod 200 for storing a drogue hose 202. The known refueling pod 200 is attached to a wing 204 of an aircraft via a pylon 206. A rotating spool 208 is located in the refueling pod 200 and has an axis of rotation perpendicular to a direction of flight 210 of the aircraft. The spool 208 is rotated by a transmission 212 with a motor to wind and unwind the drogue hose 202 around the spool 208. The drogue hose 202 is wrapped (e.g., wound) around the spool 208 when not being used for a refueling operation. The drogue hose 202 wraps around the spool 208 in multiple layers (e.g., three layers) to enable the full length of the drogue hose 202 (e.g., 70-90 feet) to be stored on the spool 208.

A guiding mechanism 214 is located in the refueling pod 200 between the spool 208 and an opening 216 for a drogue chute 218 to guide the drogue hose 202 as it winds and unwinds around the spool 208. An exit guide 220 is also disposed adjacent the opening 216 to guide the drogue hose 202 as the drogue chute 218 is deployed. An impeller (e.g., a ram air turbine (RAT)) 222 is located at a front end (e.g., a forward end) of the refueling pod 200, opposite the opening 216, to provide power to the refueling pod 200 for a power plant for the pod 224 adjacent the impeller 222 and/or the motor 212. The power plant 224 may include a fuel pump that is operative to pump fuel from one or more fuel tanks of a tanker aircraft through the drogue hose 202 to a second aircraft.

Such known under-wing refueling pods (e.g., refueling pod 200) are currently approximately 34 inches or more in diameter and can cause aerodynamic interference problems such as local low pressure, local supersonic airflow, increased drag, shock waves, noise, buffeting and vibration. In particular, the junction of the wing 204, the pylon 206, and the refueling pod 200 is an area that experiences aerodynamic interference problems. The aerodynamic interference results in a reduction of aircraft speed, necessity to remove the refueling pod(s) 200 for some operations, and higher operational and maintenance costs of the aircraft.

The example apparatus described herein reduce the diameter of the refueling pods by approximately 9 inches. An example refueling pod 300 disclosed in detail below increases a slenderness ratio (e.g., the ratio of length of the refueling pod 300 to the diameter of the refueling pod 300) by 36%, decreases frontal area by 46%, and decreases wetted area by 26%. The reduction in overall size of the example refueling pod 300 described herein substantially reduces the aerodynamic interference due to the refueling pods and lessens adverse effects of the refueling pods on the aircraft. Because of the reduction in size, the example refueling pod 300 is more suitable for use with smaller tanker aircraft than the known refueling pod (e.g., refueling pod 200 of FIG. 2).

Figure 3A:
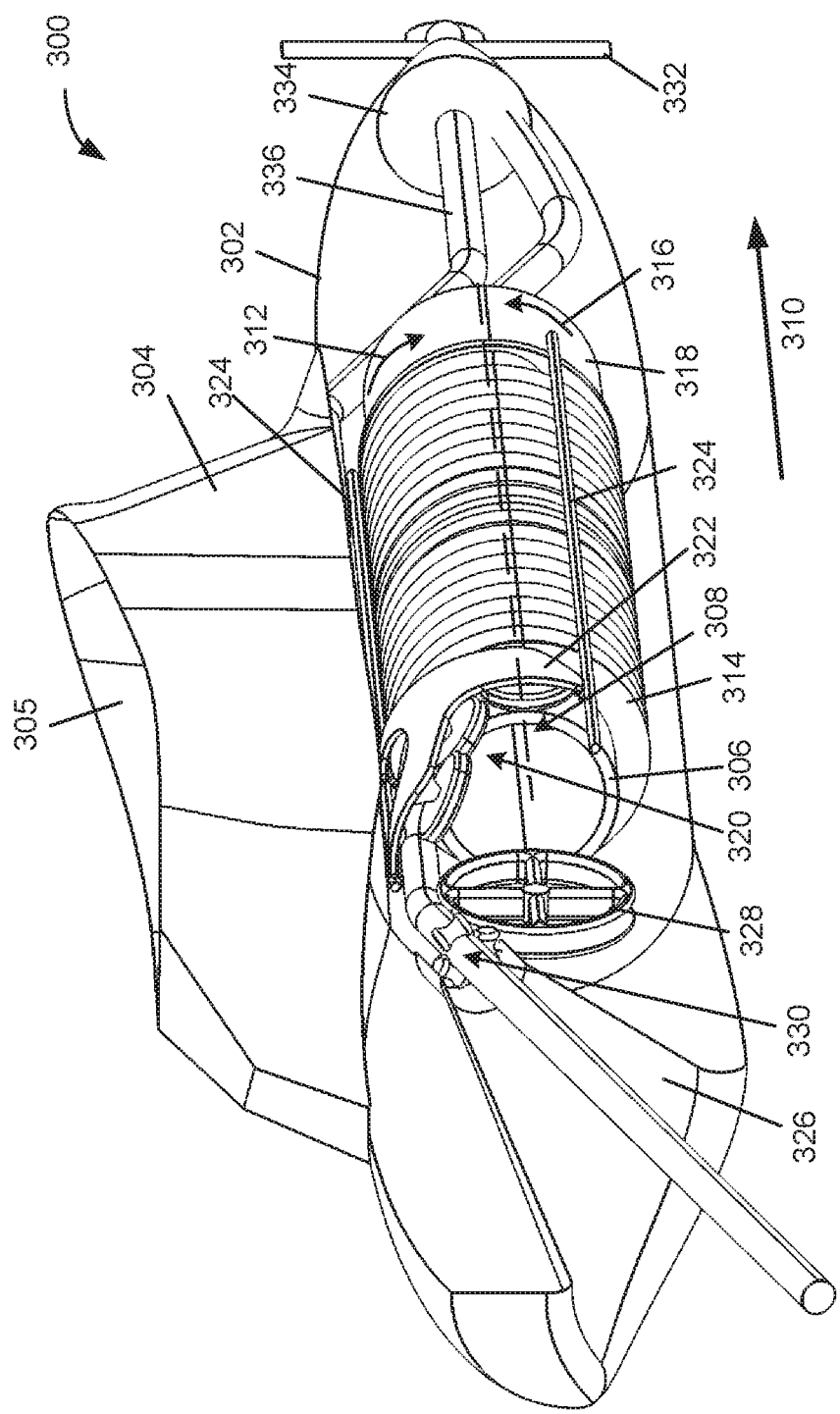
FIG. 3A is a diagram of an example refueling pod that may be implemented to refuel an aircraft.

FIG. 3A is a diagram of an example refueling pod 300 disclosed herein that may be implemented for in-flight refueling operations, such as the drogue-and-chute in-flight refueling operation of the example environment 100 of FIG. 1. The example refueling pod 300 includes a housing or shell 302 (e.g., the body of the refueling pod 300) that may be attached to an aircraft (e.g., the tanker aircraft 102 of FIG. 1, the fighter jets 104, 106 of FIG. 1, etc.). The example housing 302 contains and structurally integrates the components of the refueling pod 300 while providing proper aerodynamic properties. The example structure of the housing 302 as shown in the figures herein is not limiting and other variations of the housing 302 may be used instead. The example housing 302 may be constructed of metal or a composite material using a semi-monocoque approach. The housing 302 may be equipped with removable panels and access hatches for maintenance and repairs.

The example refueling pod 300 may be attached to the aircraft 102 via a pylon 304 that has a surface 305 contoured to interface with and couple the pod 300 to wings 112 and 114 of the example aircraft 102. Thus, the example refueling pod 300 can be attached to the wing of an aircraft to replace a known refueling pod (e.g., the known refueling pod 200). Alternatively or additionally, the surface 305 of the pylon 304 may be contoured to correspond to a contour of the body or fuselage of an aircraft (e.g., the tanker aircraft 102 or the fighter jets 104, 106) to attach the pod 300 to the fuselage of the aircraft.

The example refueling pod 300 contains a drum 306 located in the housing 302 and having a central axis 308 parallel to a direction of flight 310 of the aircraft. In some examples, the drum 306 is supported by the interior structure or surface of the housing 302 allowing rotation around the central axis 308. The drum 306 may rotate in a first direction 312 about the central axis 308 to coil a drogue hose 314 around the drum 306 and a second direction 316 about the central axis 308 to uncoil the drogue hose 314. In some examples, a transmission 318 with a motor rotates the drum 306 in the first direction 312 and/or the second direction 316. The transmission 318 may also be attached to the interior structure of the housing 302. The entire length of the drogue hose 314 (e.g., between 70 feet and 90 feet) is coiled around the drum 306 in a single layer as the drum 306 rotates in the first direction 312. In the illustrated example refueling pod 300 of FIG. 3A, as the drogue hose 314 is coiled around the drum 306, guides 320 (e.g., rollers, pulleys, etc.) guide the drogue hose 314 to ensure the drogue hose 314 is coiled tightly (i.e., coiled such that there is no slack in the drogue hose 314). The guides 320 are also positioned and/or sized to prevent damage to and/or malfunction of (e.g., collapse) the drogue hose 314 as the drogue hose 314 is wound around the drum 306.

The example guides 320 are attached to a cart 322 that slides (e.g., moves, rolls) along a track 324 (e.g., a set of rails) that is attached to the housing 302. In some examples, a long screw (e.g., screw 902 of FIG. 9) is used to move the cart 322 along the track 324. In other examples, the cart 322 is propelled using a cable winch or chain in conjunction with the track 324. In such examples, a cable or chain, which is attached to the cart 322 and propelled via the transmission 318, allows the movement of the cart 322 to be coordinated and/or synchronized with the rotation of the drum 306 in a way similar to the screw-based propulsion method described herein.

In some examples, the drum 306 is rotated by the transmission 318 in the second direction 316 to facilitate a refueling operation between two aircraft. As the drum 306 rotates in the second direction 316, a drogue chute is deployed from an opening 326 (e.g., a drogue chute cave) of the housing 302. Alternatively, when the drogue chute is deployed, the transmission 318 may be neutral and allow the force caused by the drogue chute traveling through the air to rotate the drum 306 in the second direction 316 and uncoil the drogue hose 314.

One or more guides 328, 330 may be disposed adjacent the opening 326 to guide the drogue hose 314 as the drogue hose 314 is coiled and/or uncoiled. The one or more guides 328, 330 may be attached to the housing 302 structure. In some examples, a single guiding wheel 328 (e.g., an exit guide, exit roller) is positioned adjacent the opening 326 to align the drogue hose 314 with the guides 320 to prevent slack when coiling the drogue hose 314. Additionally, a set of rollers 330 (e.g., exit guides, exit rollers) may be positioned adjacent the opening 326 and located around a circumference of the drogue hose 314 to guide the drogue hose 314 through the opening 326. The opening 326 may be shaped (e.g., tapered) to enable the drogue chute to fit inside of a larger portion of the opening 326 and not through a narrow portion of the opening 326. A diameter of the narrow portion of the opening 326 is approximately a diameter of the drogue hose 314.

In the illustrated example, an impeller (e.g., a ram air turbine (RAT)) 332 is located at a front end (e.g., a forward end) of the housing 302 and may produce power to enable proper function of the refueling pod 300. For example, the impeller 332 rotates during flight to produce power (e.g., via a torque from a rotating shaft of the impeller 332) using a power plant of the pod 300, which is supplied to the motor to rotate the drum 306 via the transmission 318. The power plant may include a fuel pump 334 that is coupled to a fuel line 336 and operative to pump fuel from a fuel tank of an aircraft (e.g., the tanker aircraft 102) to which the refueling pod 300 is attached to a fuel tank of a second aircraft (e.g., the fighter jets 104, 106, bombers, attack planes, drones, transport planes, reconnaissance planes, helicopters, or other tankers) via the drogue hose 314. An angle of attack of blades (e.g., vanes) can be adjusted during flight to deliver variable amounts of power as needed. When the fuel pump 334 and/or the transmission 318 are not in use (e.g., a refueling operation is not taking place) and power is not needed, the blades of the impeller 332 are "feathered" (i.e., set to such a pitch to produce zero moment while minimizing air drag caused by the impeller 332 for the tanker aircraft 102). In other examples, the power for the fuel pump 334 and transmission 318 to rotate the drum 306 can be provided by a power source of the aircraft 102. In such examples, the refueling pod 300 does not include the impeller 332.

Figure 3B:
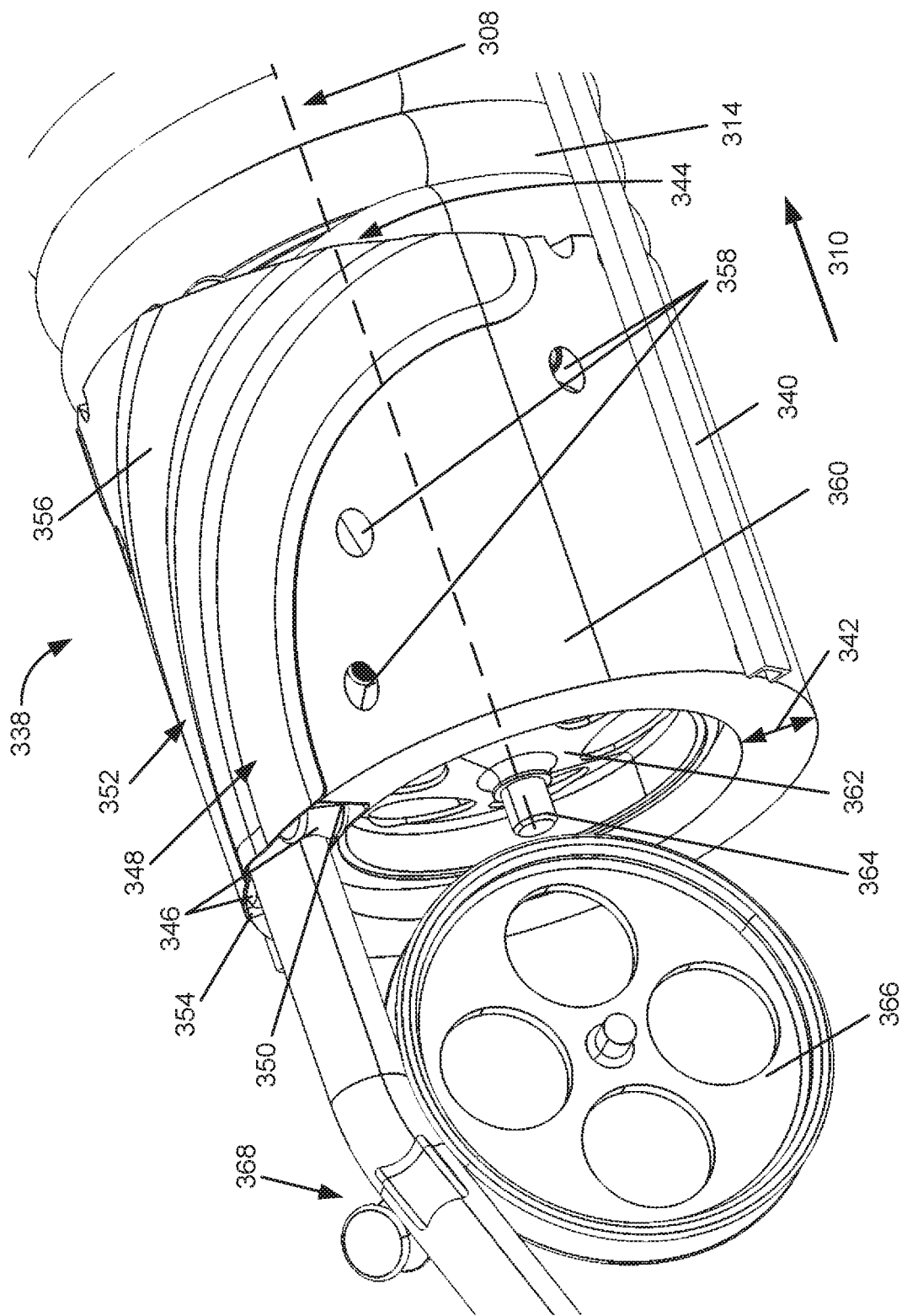
FIG. 3B is a diagram of an example guiding apparatus that may be disposed in the example refueling pod of FIG. 3A.

FIG. 3B is an example alternative cart or carriage 338 that may be used instead of the cart 322 to guide the drogue hose 314 as the drogue hose 314 winds or unwinds around the drum 306. The carriage 338 is on a track or rails 340 to guide a movement of the carriage 338 along the length of the drum 306. The example carriage 338 is shaped to tightly coil the drogue hose 314 around the drum 306 and the carriage 338 may surround an outer surface of the drum 306. Alternatively, the example carriage 338 may only partially surround the outer surface of the drum 306. The carriage 338 has a thickness 342 approximately the width or diameter of the drogue hose 314 so that the entire carriage 338 can fit within the profile of the drogue hose 314 and does not increase the dimensions of the pod 300. The drogue hose 314 is guided through a channel 344 of the carriage 338. The channel 344 of the carriage 338 is curved to facilitate guiding the drogue hose 314 into a tight coil around the drum 306 without damaging the drogue hose 314. The curvature of the channel 344 is determined based on a flexibility and/or an allowable bend radius of the drogue hose 314 (i.e., the amount the drogue hose 314 can bend without damage or collapse).

Pulleys or rollers 346 are located within the channel 344 of the carriage 338 to guide the drogue hose 314 as the drogue hose 314 is coiled or uncoiled around the drum 306. Inner rollers 348 are located adjacent an inner edge 350 of the channel 344 and outer rollers 352 are located adjacent an outer edge 354 of the channel 344. The rollers 346 are positioned on either side of the channel 344 such that a distance between the inner rollers 348 and the outer rollers 352 is substantially the width or diameter of the drogue hose 314 throughout the channel 344. Thus, the drogue hose 314 remains in contact with the inner rollers 348 and/or the outer rollers 352 throughout the length of the channel 344. The rollers 346 may reduce friction on the drogue hose 314 as the drogue hose 314 passes through the channel 344, thus reducing an amount of wear on the drogue hose 314.

A cover 356 is positioned over the channel 344 and rollers 346 to protect the rollers 346 and/or to keep the drogue hose 314 in place within the channel 344. The cover 356 may snap or lock into place on the carriage 338 and/or may be secured with fasteners (e.g., bolts, screws, clips, etc.). The example carriage 338 includes apertures or openings 358 in which wheel casters (e.g., example casters 1302 of FIG. 13) may be inserted. The example apertures 358 may be at an angle (e.g., not perpendicular) relative to an outer surface 360 of the carriage 338.

In the illustrated example, the drum 306 includes a bulkhead 362 (e.g., an end cover) to facilitate attachment of the aft end of the drum 306 to an internal structure or surface of the example refueling pod 300. The bulkhead 362 may include apertures, as shown in the illustrated example of FIG. 3B, which may reduce the weight of the bulkhead 362. Alternatively, the bulkhead 362 may be a solid disk. A protrusion 364 of the bulkhead 362 may be attached to the internal surface or structure of the example refueling pod 300.

Exit guides 366, 368, which are substantially similar to the exit guides 328 and 330, may be located adjacent the aft end of the drum 306. The exit guides 366, 368 may include an exit guide wheel 366 and exit rollers 368 to guide the drogue hose 314 away from the drum 306 and through the drogue chute cave 326 as the drogue hose 314 is unwound. Additionally, the exit guide wheels 366 and exit rollers 368 guide the drogue hose 314 towards the carriage 338 as the drogue hose 314 is coiled around the drum 306.

Figure 4A:
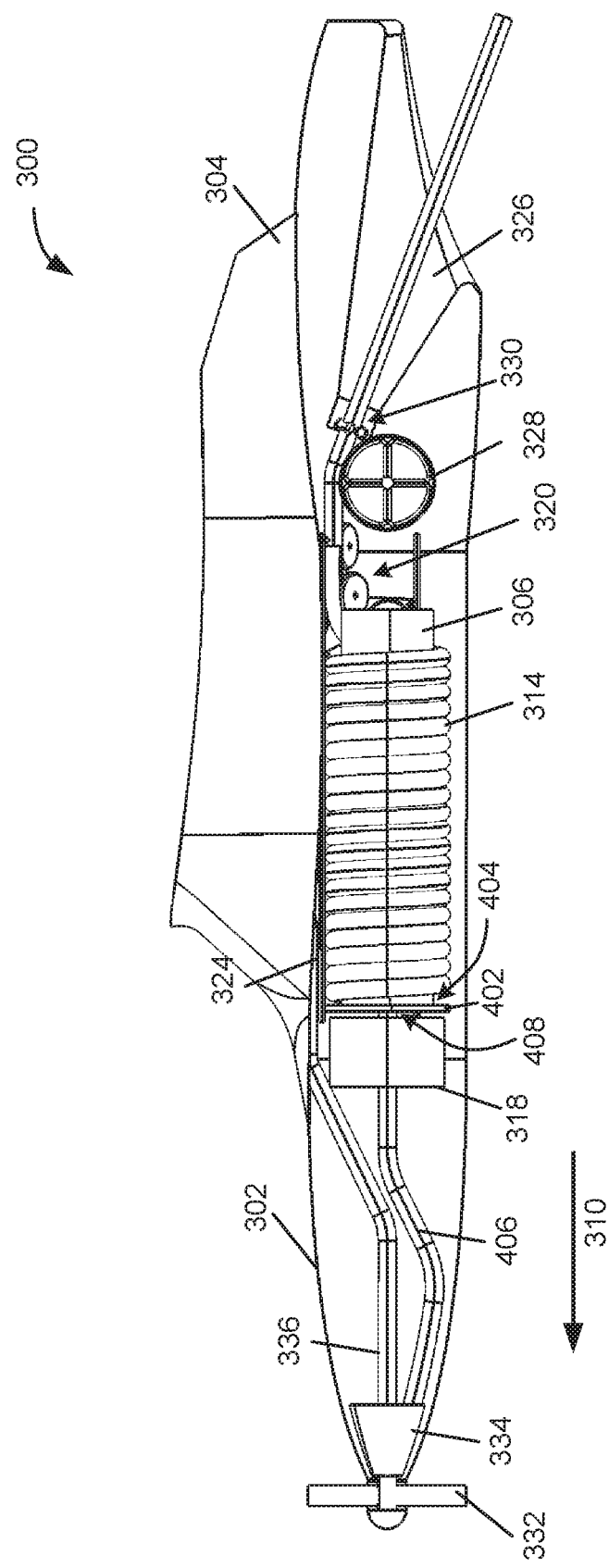
FIGS. 4A-4C are side section views of example refueling pods disclosed herein.

FIG. 4A is a side section view of the example refueling pod 300 disclosed herein. As shown in FIG. 4A, the drum 306 may include a plate (e.g., a disk, a front collar) 402 at a forward end 404 of the drum 306 adjacent the transmission 318. In some examples, the plate 402 acts as a stop to prevent the drogue hose 314 from sliding off the forward end 404 of the drum 306 as the drogue hose 314 is coiled around the drum 306. A non-rotating fuel line 406 extending between the fuel pump 334 in the power plant and the drum 306 is coupled to a first end of a rotating tube 408. The drogue hose 314 is coupled to a second end of the rotating tube 408 on an outside of the drum. The coupling between the rotating tube 408 and each of the non-rotating fuel line 406 and the drogue hose 314 is sealed in a manner that allows relative rotation of the rotating tube 408 while preventing leaks at the first and second ends of the rotating tube 408.

Figure 4B:
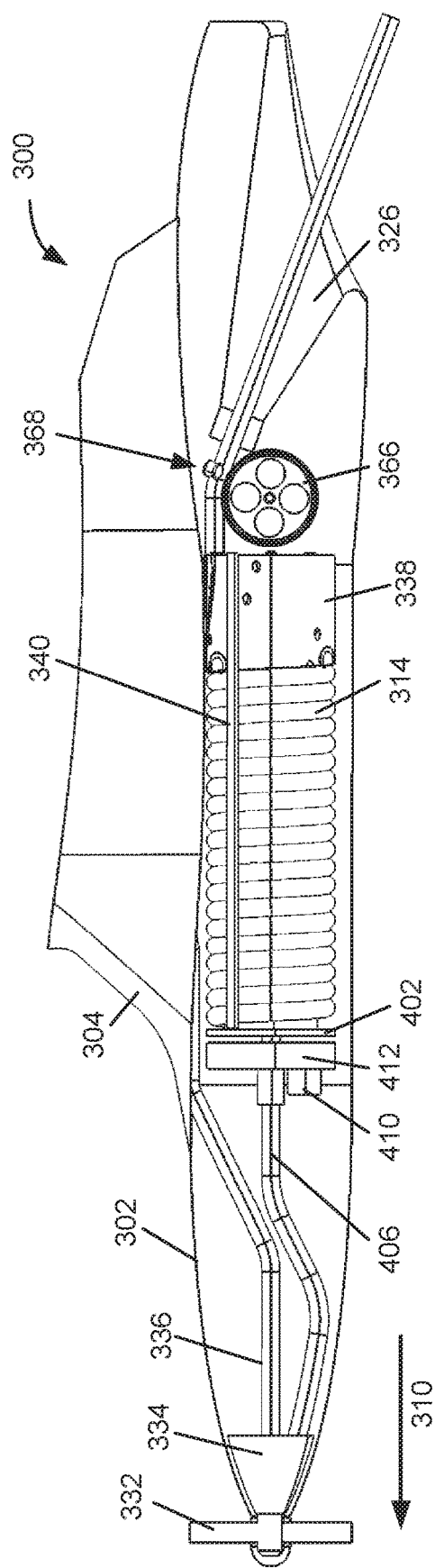
Figure 4C:
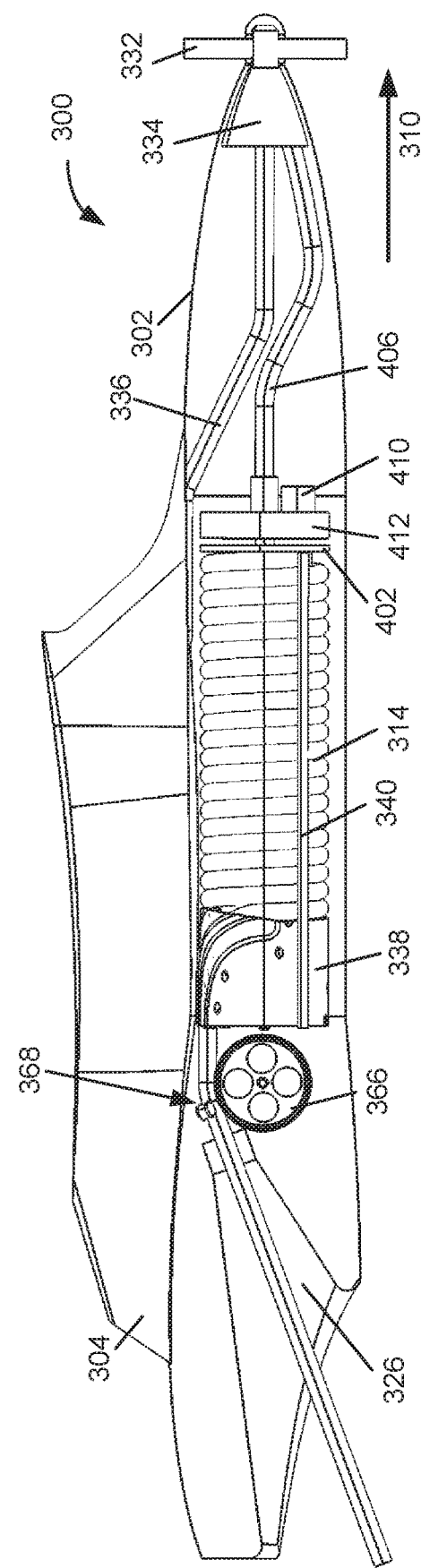

FIGS. 4B and 4C depict the example refueling pod 300 in which the example carriage 338 is implemented. As shown in FIGS. 4B and 4C, the example refueling pod 300 is used in conjunction with the example carriage 338 instead of the example cart 322 to coil the drogue hose 314 around the drum 306. The example refueling pod 300 of FIGS. 4B and 4C includes an alternative example motor 410 and transmission (e.g., propulsion mechanism) 412. The alternative motor 410 and/or the transmission 412 may receive power from the impeller (e.g., ram air turbine (RAT)) 332 and/or the power plant 334 to rotate the drum 306. The example motor 410 may be an electric or a hydraulic motor. In some examples, the transmission 412 receives power via the motor 410, while in other examples the transmission 412 receives power directly from the power plant and the example pod 300 does not include the motor 410.

FIGS. 5A and 5B are side views from the left and right sides, respectively, of the components located within the housing 302. The cart 322 is shaped as shown in FIG. 5B to indicate the function only and does not necessarily describe the only real and practical shape of the cart 322. The function of the cart 322 is to keep guides 320 in proper geometrical position (e.g., alignment) relative to the drogue hose 314 and allow the cart 322 to move along the track 324 (e.g., a set of rails). For example, a cart 322 having a different shape may be operative to keep the guides 320 in the proper geometrical position.

Figure 6A:
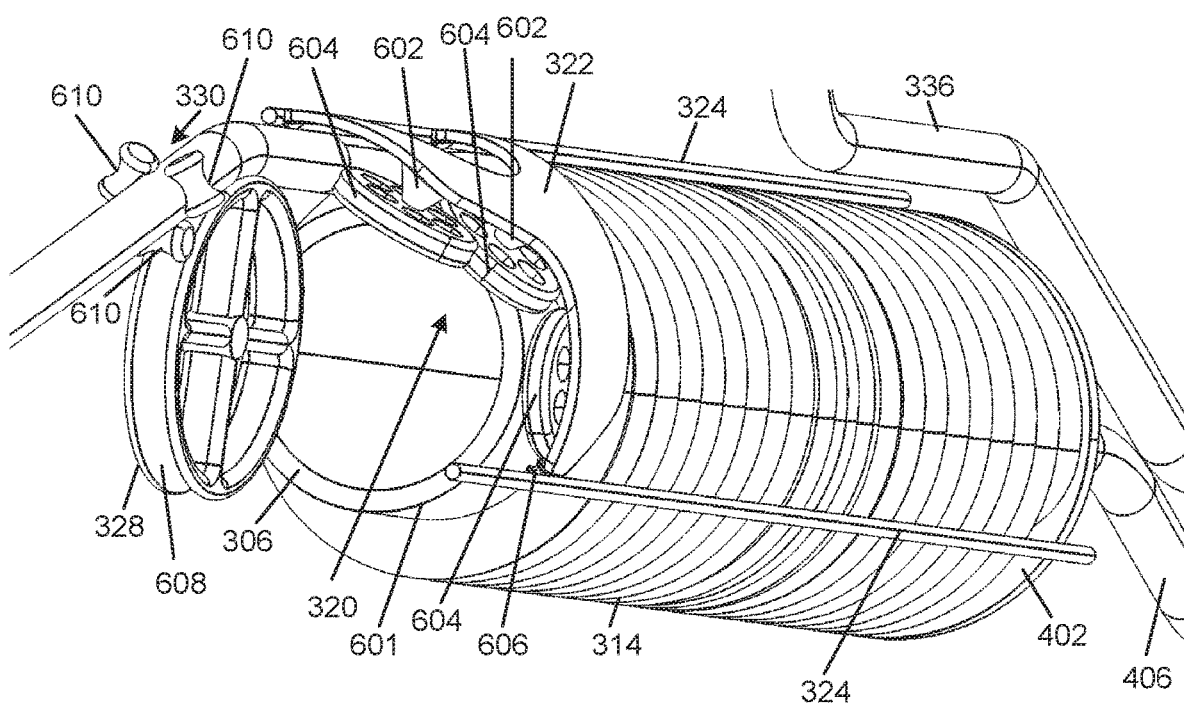
FIGS. 6A and 6B are more detailed views of example drums and guiding apparatus disclosed herein.

FIG. 6A is a more detailed view of the example drum 306 and cart 322 disclosed herein. In the illustrated example, the drum 306 is hollow to minimize the weight of the refueling pod 300 without compromising its strength. The diameter of the drum 306 is selected based on the ability of the drogue hose 314 to bend (e.g., an allowable bend radius of the drogue hose 314 based on its flexibility). The allowable bend radius of the drogue hose 314 may be the same allowable bend radius as the hose 202 in the known refueling pod 200 of FIG. 2. For example, the minimum radius about which the drogue hose 314 can coil may be approximately 7.7 inches and, thus, the diameter of the drum 306 used with the example drogue hose 314 is approximately 15.4 inches or larger. In other examples, the drogue hose 314 may have a different bend radius and, thus, a drum 306 having a larger diameter may be required or a drum 306 having a smaller may be sufficient.

As illustrated in FIG. 6A, the example cart 322, including all of the guides 320, is shaped and sized to be contained (e.g., to fit) within a space between a surface 601 of the drum 306 on which the drogue hose 314 is coiled and a structure of the housing 302 for every position of the cart 322 as the cart 322 travels along the track 324. To maintain a low level of friction, the guides 320 do not contact the drum 306 and are coupled to the cart 322 such that the guides 320 are able to rotate (i.e., to act as pulleys) as the drogue hose 314 passes over the guides 320. The cart 322 is positioned on the track 324 (i.e., on the rails) such that the cart 322 is able to move forward or backward along the track 324. The track 324 (e.g., the rails) is fixed in a position adjacent the drum 306 so that the track 324 does not interfere with the drogue hose 314 being coiled or uncoiled around the drum 306. For example, the track 324 may be integral to the structure of the housing 302 and positioned such that the drogue hose 314 may coil 306 around the drum 306 between the surface 601 of the drum 306 and the track 324. Positioning the guides 320 within the shadow of the drogue hose 314 reduces the amount of excess space in the housing 302 due to the guides 320, the cart 322, and the track 324.

The example cart 322 includes protrusions (e.g., bosses, posts, etc.) 602 on an inner surface of the cart (e.g., the surface facing towards the drum 306) to couple each of the guides 320 to the cart 322. In some examples, the protrusions 602 may include bearings and/or fasteners to couple the guides 320 to the protrusions and enable the guides 320 to rotate freely as the drogue hose 314 passes over the guides 320 when the drogue hose 314 is coiling and/or uncoiling. The example guides 320 may include a groove 604 to at least partially receive the drogue hose 314 as the guides 320 guide the coiling and uncoiling of the drogue hose 314. Alternatively, the curved surface of the guides 320 may be smooth (e.g., a disk) that rotates as the drogue hose 314 is coiled around the drum 306. The cart 322 also includes wheels 606 (e.g., rollers) to enable the cart 322 to move along the track 324 with minimum friction as the drogue hose 314 is coiled or uncoiled around the drum 306. In the example shown in FIG. 6A, the wheels 606 are located between the rails 324 and have grooves to guide the wheels 606 along the track 324 to prevent the cart 322 from falling off (e.g., becoming misaligned with) the track 324. Alternatively, the wheels 606 may be positioned inside of grooves integrated into a shape of the rails 324 to prevent the cart 322 from falling off the track 324.

Additionally, the guiding wheel 328 and the set of rollers 330 may include grooves 608 and/or curved surfaces 610, respectively, to guide and/or receive the drogue hose 314 as the drogue hose 314 travels through the guiding wheel 328 and the set of rollers 330.

Figure 6B:
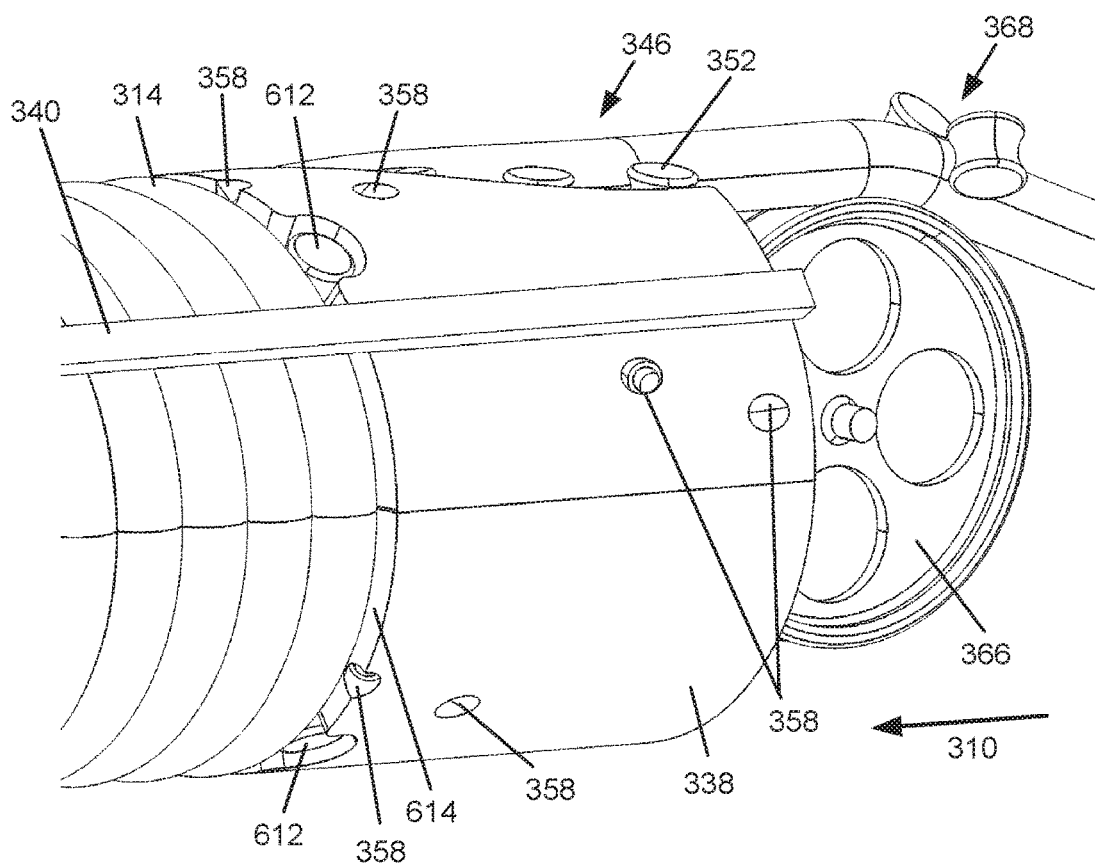

FIG. 6B is an alternate view of the example carriage 338 and the drum 306. The carriage 338 is shown in FIG. 6B without the cover 356 covering the rollers 346. The carriage 338 includes forward rollers 612 located on a forward edge 614 of the carriage 338 to facilitate guidance of the of the drogue hose 314 as the drogue hose 314 coils around the drum 306. The forward rollers 612 facilitate tightly coiling the drogue hose 314 around the drum 306. Additionally, the forward rollers 612 also enable the drum 306 and coiled drogue house 314 to rotate relative to the carriage 338 without interference from the forward edge 614 of the carriage 338 that may cause wear or damage to the drogue hose 314. For example, including the rollers 612 on the forward edge 614 of the carriage 338 may prevent or reduce damage or wear to the drogue hose 314 and/or reduce friction between the coiled drogue hose 314 and the forward edge 614 of the carriage 338. In some examples, the forward edge 614 of the carriage 338 is angled or tapered to follow the angle of the drogue hose 314 as the drogue hose 314 is coiled around the drum 306. The tapered forward edge 614 prevents the carriage 338 from interfering with the drogue hose 314 as the drogue hose 314 is coiled or uncoiled around the drum 306 and also allows the carriage 338 to maintain contact with the drum 306 around the entire circumference of the drum 306, thus ensuring the drogue hose 314 is tightly coiled around the drum 306.

Figure 7A:
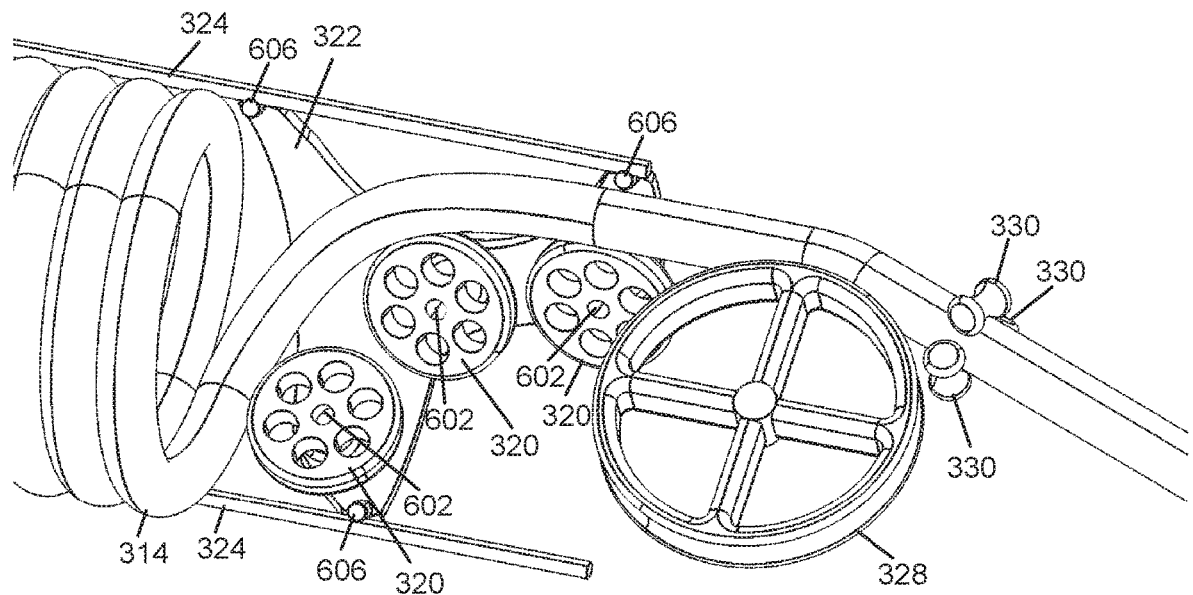
FIGS. 7A and 7B are more detailed views of the drogue hose and example guiding apparatus disclosed herein.

FIG. 7A is a more detailed view of the drogue hose 314 and example guiding apparatus disclosed herein (e.g., the guides 320, 328, 330, the cart 322, and the track 324). In the illustrated example, three guides 320 are used to guide the drogue hose 314 as the drogue hose 314 is coiled around the drum 306. The number and position of the guides 320 in the example refueling pod 300 is selected to prevent damage to the drogue hose 314, such as collapse, kinking, etc. as the drogue hose 314 coils around the drum 306. For example, a single larger guide may prevent collapse of the drogue hose 314, but not fit within the housing 302 and a single smaller guide may not be sufficient to prevent the drogue hose 314 from being damaged. Thus, the placement and sizing of the example guides 320 selected is based on the flexibility of the example drogue hose 314 and maintains a minimum radius of curvature (e.g., is equivalent to or greater than the minimum radius of curvature or bend radius that will not damage the drogue hose 314) of the drogue hose 314 as the drogue hose 314 is coiled around the drum 306. In other examples where the drogue hose 314 is more or less flexible, a different number, a different size, or a different placement of the guides 320 may be sufficient and/or required to prevent damage of the drogue hose 314 and may be implemented in the example refueling pod 300.

Figure 7B:
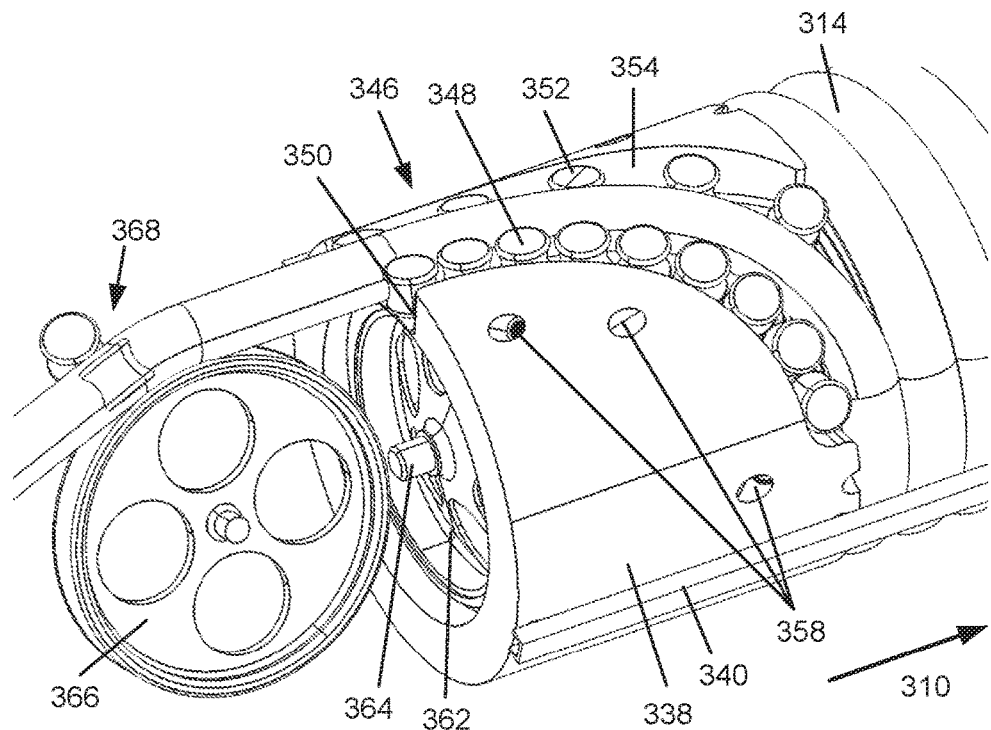

FIG. 7B depicts a more detailed view of the rollers 346 within the channel 344 of the carriage 338. In the illustrated example of FIG. 7B, the cover 356 is not covering the rollers 346. As shown, the inner rollers 348 are located between the drogue hose 314 and the inner edge 350 of the channel 344. The inner rollers 348 may include any number of rollers to facilitate low-friction movement of the drogue hose 314 through the channel 344 and prevent or reduce wear and damage to the drogue hose 314. The illustrated example includes nine inner rollers 348. Alternatively, fewer or more inner rollers 348 may be used, provided the rollers fit within the channel 344 between the drogue hose 314 and the inner edge 350.

The outer rollers 352 are located between the drogue hose 314 and the outer edge 354 of the channel 344. The outer rollers 352 may also include any number of rollers to facilitate low-friction movement of the drogue hose 314 through the channel 344 and prevent or reduce wear and damage to the drogue hose 314. The illustrated example includes five outer rollers 352. Alternatively, fewer or more outer rollers 352 may be used, provided the rollers fit within the channel 344 between the drogue hose 314 and the outer edge 354. The arrangement of the inner rollers 348 and outer rollers 352 allows the drogue hose 314 to bend gradually as the drogue hose 314 is coiled around the drum 306. Thus a bending force applied by the rollers 348, 352 does not exceed a strength of walls of the drogue hose 314 and the drogue hose 314 is not damaged while being coiled around the drum 306.

Figure 8A:
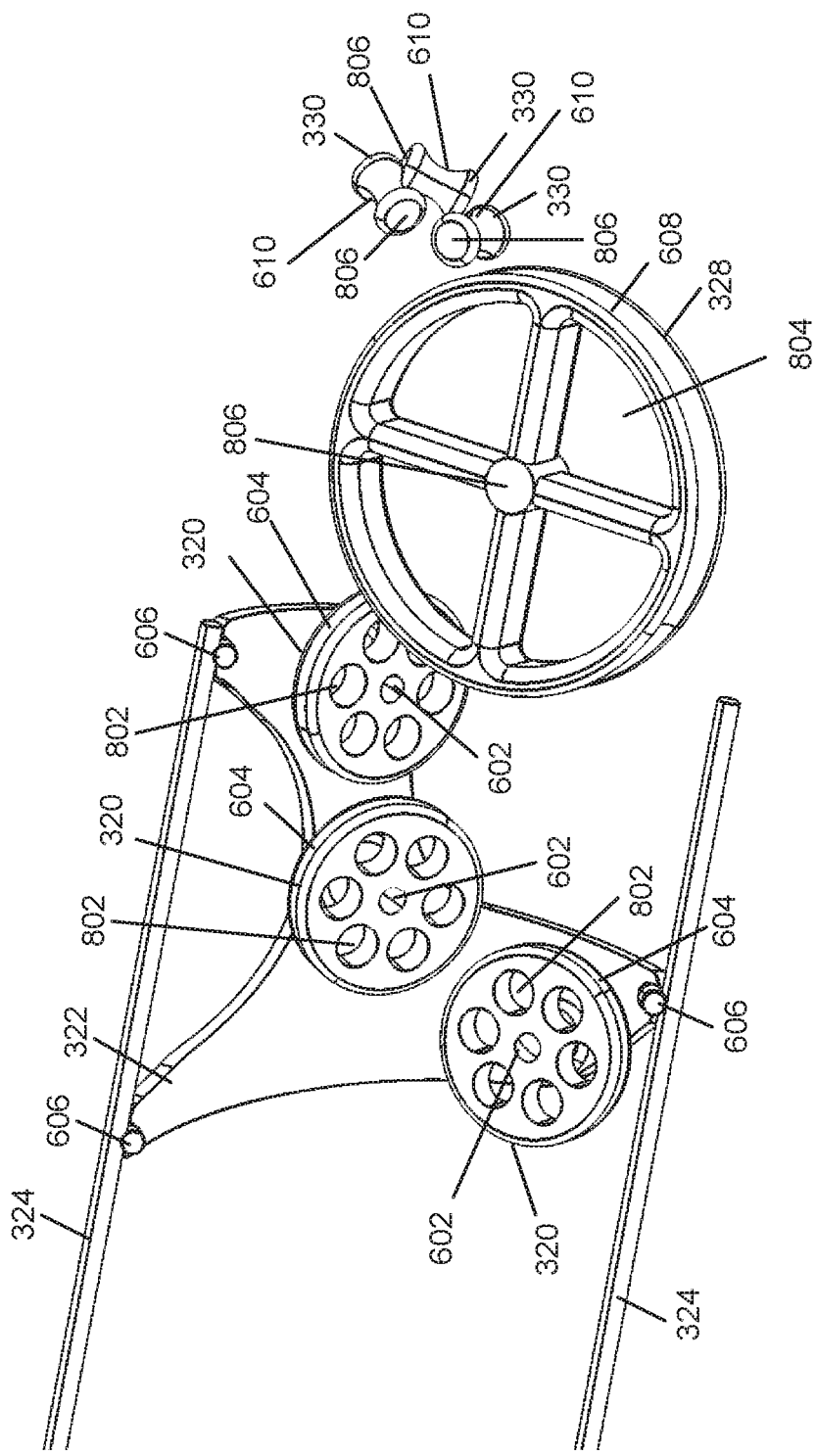

FIG. 8A is a detailed view of the guiding apparatus disclosed herein. In the illustrated example, the guides 320 include apertures 802 (e.g., multiple apertures). The apertures 802 may be implemented in the guides 320 to reduce the weight of the guides 320. Alternatively, the guides 320 may be solid disks. Additionally or alternatively, the guiding wheel 328 may include apertures 804 to reduce the weight of the guiding wheel 328. The guiding wheel 328 and/or the set of rollers 330 may be attached to the interior of the housing 302 in a manner that allows free rotation of the guiding wheel 328 and rollers 330.

Figure 8C:
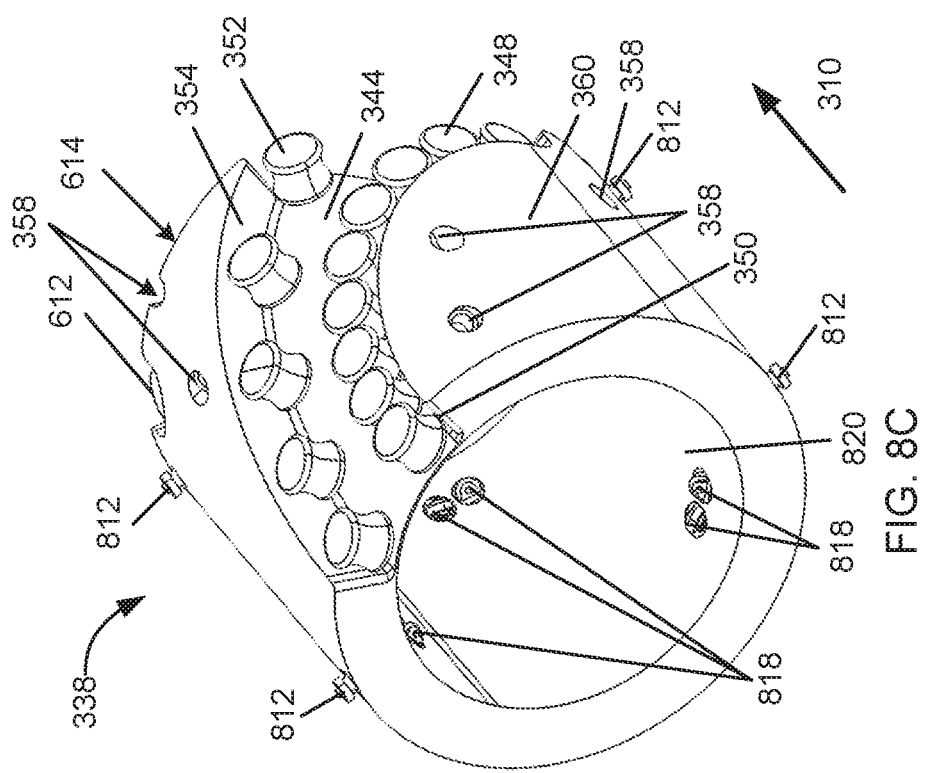
Figure 8B:
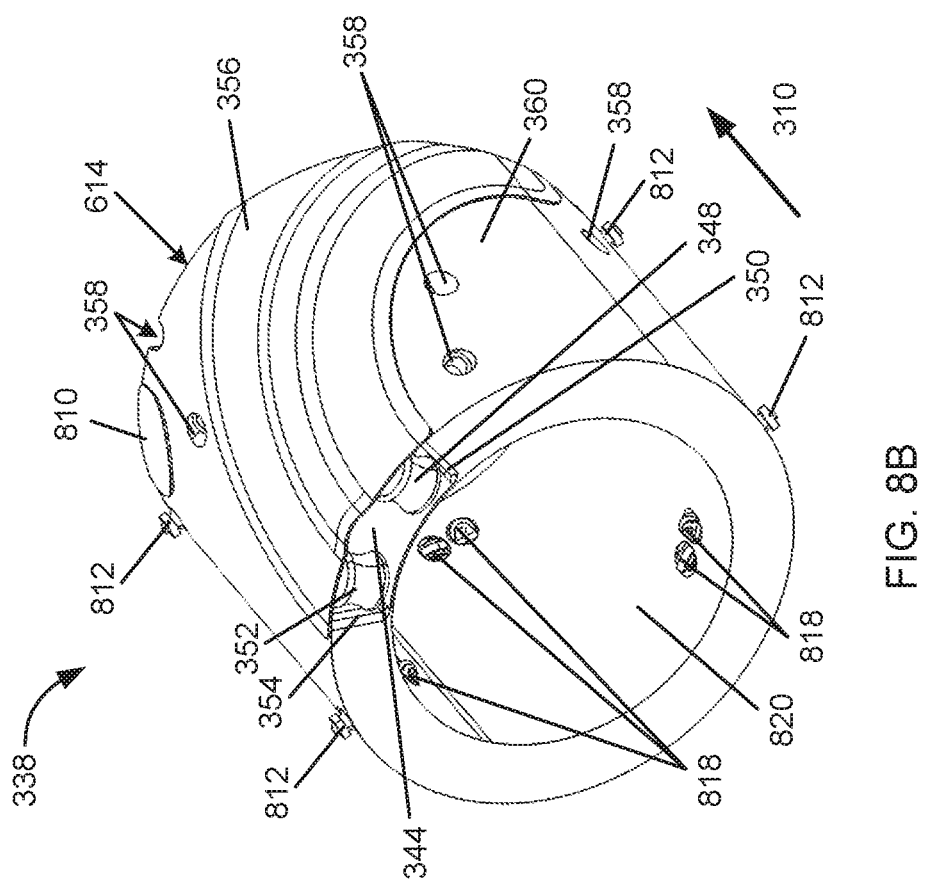

FIGS. 8B-8D are detailed views of the example carriage 338. FIG. 8B depicts a rear view of the example carriage 338 including the cover 356. The example rollers 346 of the carriage 338 may include axles having two portions. The first portion of the axle is attached to the surface of the channel 344 and the second portion of the axle is attached to the cover 356 to ensure proper alignment of the rollers 346 and/or the cover 356. The example carriage 338 may be constructed as a sandwich structure with a honeycomb or foam core between the inner and outer surfaces 820, 360. Alternatively, the carriage 338 may be a solid structure with holes or bores to reduce the weight of the carriage 338. As shown in FIG. 8B, additional covers 810 may be positioned on the outer surface 360 of the carriage 338 to cover and/or protect the forward rollers 612 disposed along the forward edge 614 of the carriage 338. FIG. 8C depicts a rear view of the example carriage 338 without the covers 356 and 810 and FIG. 8D depicts a front view of the example carriage 338 without the covers 356 and 810.

As shown in FIGS. 8B-8D, the example carriage 338 also includes exterior wheels 812 disposed on the outer surface 360 of the carriage 338 to interface with the track or rails 340. The example exterior wheels 812 fit within grooves or channels 814 (as shown in FIG. 8E) of the rails 340 to guide the carriage 338 as the carriage 338 moves along the length of the drum 306 on the track 340. FIG. 8E is a detailed view of the example exterior wheels 812 disposed within one of the grooves 814 in one rail of the track 340. The example exterior wheels 812 may be attached to a protrusion 816 on the outer surface 360 of the drum 306. Alternatively, the wheels 812 may include grooves to fit over a rail. In some examples, the carriage 338 may include one wheel 812 to interface with each rail of the track 340 and located on opposite sides of the carriage 338. In the examples using only one wheel 812 per rail, the loads on the drum 306, the wheels 812, and/or components of the carriage 338 (e.g., the inner wheels 818) may be more than in the examples using multiple wheels 812 for each rail. The examples wheels 812 and/or the inner wheels 818 may be flexibly mounted.

The example carriage 338 also includes interior wheels 818 protruding from an interior surface 820 of the drum 306 to interface with the surface of the drum 306 as the drum 306 rotates. The interior wheels 818 may be angled (e.g., not perpendicular) relative to the inner surface 820 of the carriage 338. In some examples, the drum 306 includes grooves in which the interior wheels 818 are located. In such examples, the interior wheels 818 are angled to correspond to an angle of the groove on the surface of the drum 306. In the illustrated examples, the interior wheels 818 are positioned in pairs with each wheel in the pair having a different angle to contact different surfaces of the groove in the drum 306. Alternatively, the interior wheels 818 may be placed singularly or in groups of more than two. In some alternative examples, one or more of the interior wheels 818 may be substantially perpendicular to the interior surface 820 of the carriage 338 to contact the surface of the drum 306, which may or may not include a helical groove.

Figure 9:
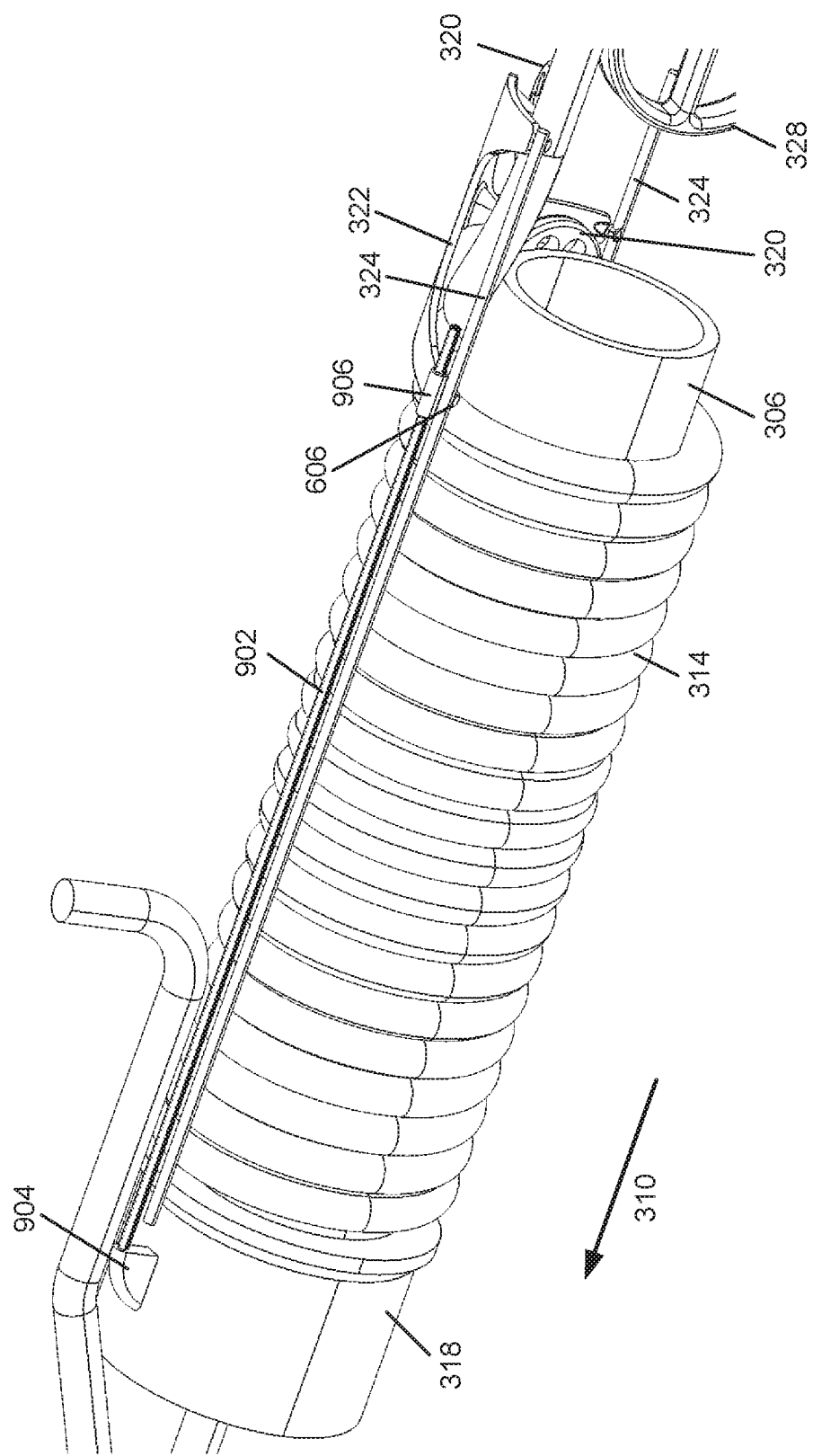
FIG. 9 depicts an example method of moving the cart along the track of the example refueling pods disclosed herein.

FIG. 9 depicts an example screw 902 operative to move the cart 322 along the track 324 of the example refueling pod 300 disclosed herein. The example screw 902 is positioned adjacent one rail of the track 324 and is operative to coordinate the movement of the cart 322 with the rotation of the drum 306. The example screw 902 may be positioned adjacent either of the two rails of the track 324. For example, the cart 322 moves along the track 324 a distance equivalent to a width (e.g., a diameter) of the drogue hose 314 for each complete rotation of the drum 306. Thus, the rotations per minute (RPM) of the screw 902 and the pitch of the thread are selected to provide a movement rate of the cart 322 equal to one width of the drogue hose 314 for each complete rotation of the drum 306. The screw 902 is coupled to and propelled (e.g., rotated) by the transmission 318 with the motor. A projection 904 (e.g., a second output) of the transmission 318 coordinates the rotation of the screw 902 with the rotation of the drum 306.

The screw 902 is connected to the cart 322 via a nut 906 attached to the cart 322. The nut 906 has inner threads that engage with outer threads of the screw 902. When the screw 902 is rotated, an interaction between the inner threads of the nut 906 and the outer threads of the screw 902 causes the cart 322 to move along the track 324.

Figure 10:
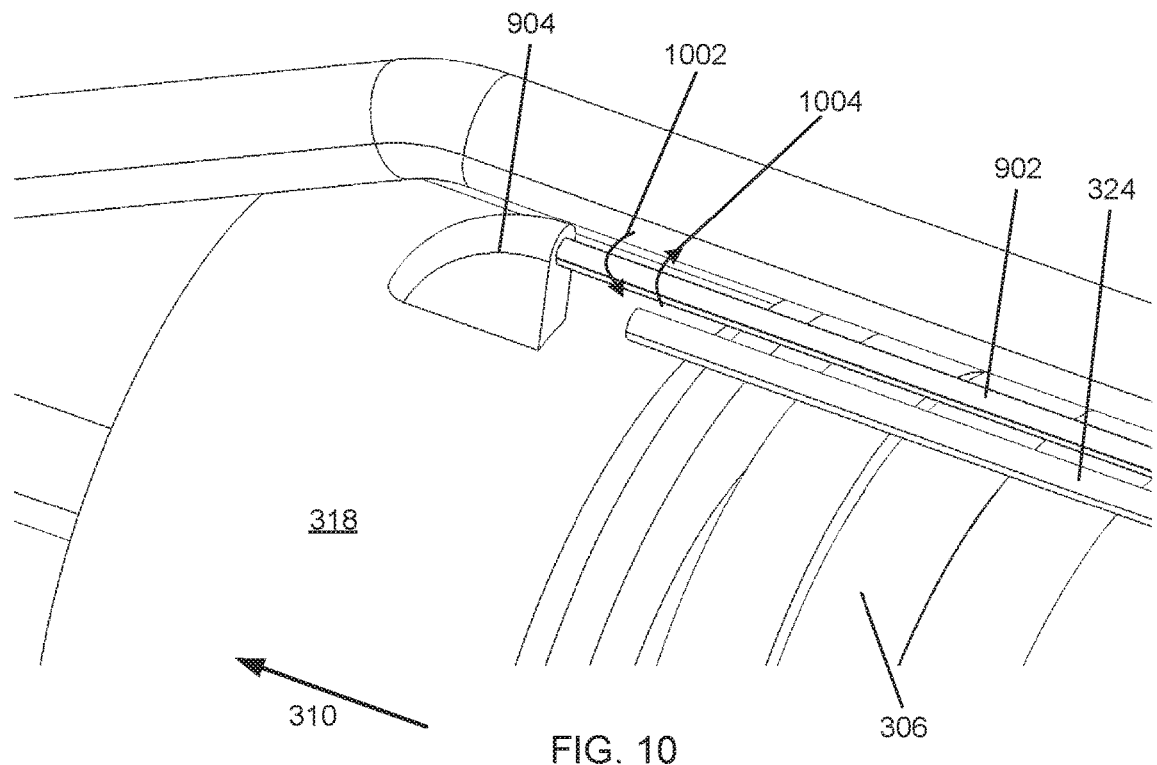
FIG. 10 is a detailed view of the example method of moving the cart along the track.

FIG. 10 is a detailed view of the example screw 902 and the example projection 904 contains a mechanism to turn the screw 902 to enable movement of the cart 322 along the track 324. The example projection 904 is operative to rotate the screw 902 in a first direction 1002 or a second direction 1004. In some examples, the screw 902 and nut 906 are threaded such that rotating the screw 902 in the first direction 1002 causes the cart 322 to move forward relative to the direction of flight 310 (e.g., the cart 322 moves towards the motor and transmission 318 as the drogue hose 314 is unwound from the drum 306) and rotating the screw 902 in the second direction 1004 causes the cart 322 to move aft relative to the direction of flight 310 (e.g., the cart 322 moves away from the motor and transmission 318 as the drogue hose 314 is wound around the drum 306). Alternatively, the screw 902 and nut 906 may be threaded such that rotating the screw 902 in the first direction 1002 causes the cart 322 to move aft relative to the direction of flight 310 and rotating the screw 902 in the second direction 1004 causes the cart 322 to move forward relative to the direction of flight 310.

Figure 11:
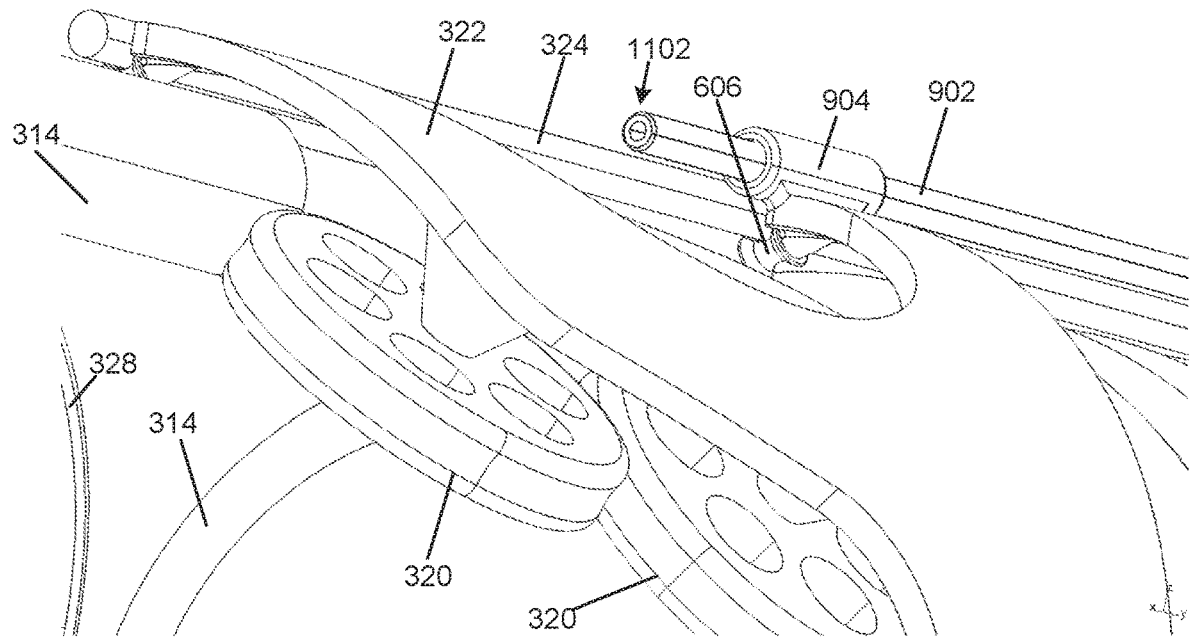
FIG. 11 is another detailed view of the example method of moving the cart along the track.

FIG. 11 is a detailed view of the screw 902 and the example nut 906 attached to the cart 322. The example nut 906 may be attached to the cart 322 in any location allowing engagement with the screw 902. This enables the cart 322 to move along the track 324.

The example screw 902 includes an end 1102 that is attached to structure of the example refueling pod 300. This attachment (or support) enables the screw 902 to rotate. In some examples, the support may include a bearing or may be made of a low-friction material to reduce an amount of friction between the screw 902 and the support as the screw 902 rotates.

Figure 12:
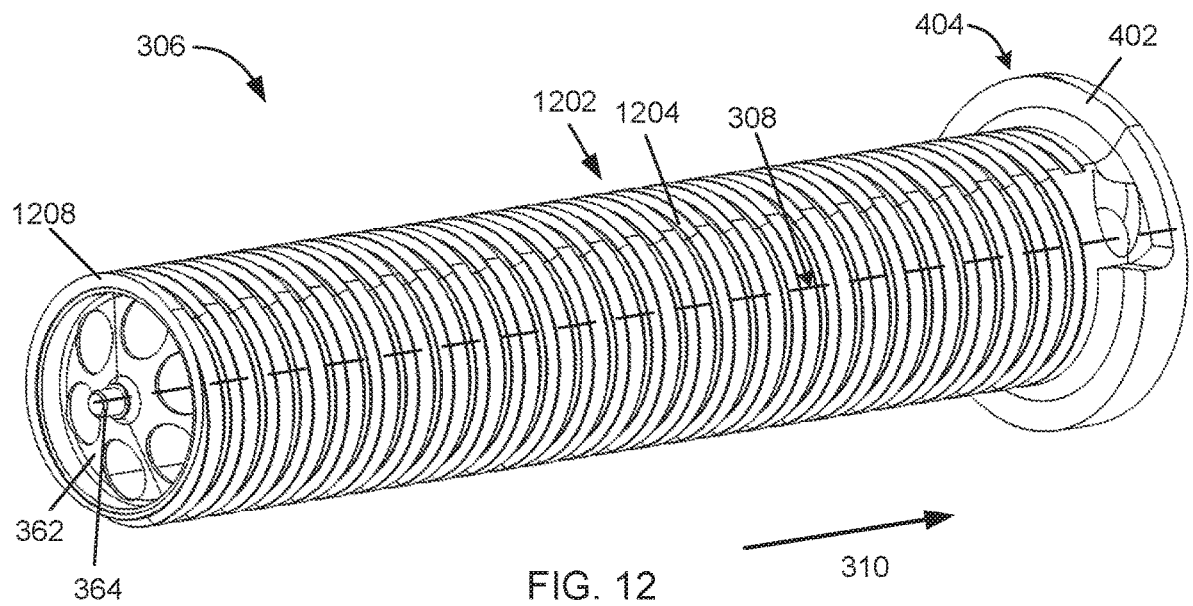
FIG. 12 depicts an example drum that may be used with the example guiding apparatus disclosed herein.

FIG. 12 depicts an example with the drum 306 having a grooved outer surface 1202 that may be used with the example carriage 338 disclosed herein. The grooved outer surface 1202 includes a helical (e.g., spiraled) groove 1204 that resembles the threading of a screw or bolt. A pitch of the helical groove 1204 may be determined based on the diameter of the drogue hose 314 such that, after a complete rotation about an axis 308 of the drum 306, a non-rotating carriage 338 interfacing with the helical groove 1204 moves along the length of the drum 306 a distance equal to the diameter of the drogue hose 314. The helical groove 1204 begins at a forward end 404 of the drum 306, adjacent an aperture 1206 in the collar 402, and tapers to an end at an aft end 1208 of the drum 306 adjacent the bulkhead 362.

Figure 13:
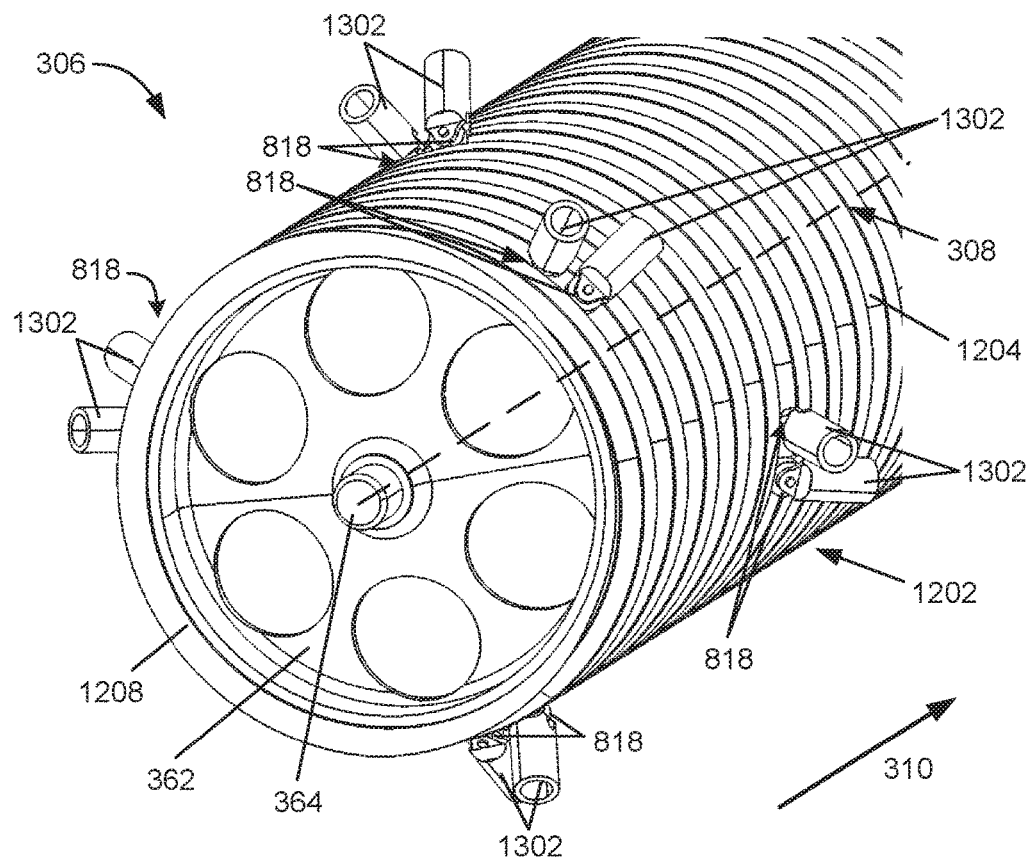
FIG. 13 is a detailed view of the example drum and wheels of the example guiding apparatus disclosed herein.

FIG. 13 depicts an interaction between the interior wheels 818 of the carriage 338, the grooved outer surface 1202 and/or the helical groove 1204 of the example drum 300 of FIG. 12. The interior wheels 818 are positioned around the drum 306 and may help support the carriage 338 and/or keep the carriage 338 from interfering with the grooved surface 1202 and/or the drum 306. The interior wheels 818 are attached to the carriage 338 using casters 1302 located within the carriage 338 through the apertures 358 of the carriage 338. As the drum 306 rotates the interior wheels 818 roll along surfaces (e.g., surfaces 1402 and 1404 of FIGS. 14A and 14B) of the helical groove 1204. The carriage 338 is prevented from rotating by the track 340 and, thus, as the interior wheels 818 roll along the surfaces of the helical groove 1204, the carriage 338 is moved forward or aft along the drum 306, based on the direction of rotation. Therefore, the carriage 338 responds to the rotation of the drum 306 in a similar manner as a nut rotating around threads of a screw and changes a lateral position of the carriage 338 along the axis 308 as the drum 306 rotates about the axis 308.

Figure 14A:
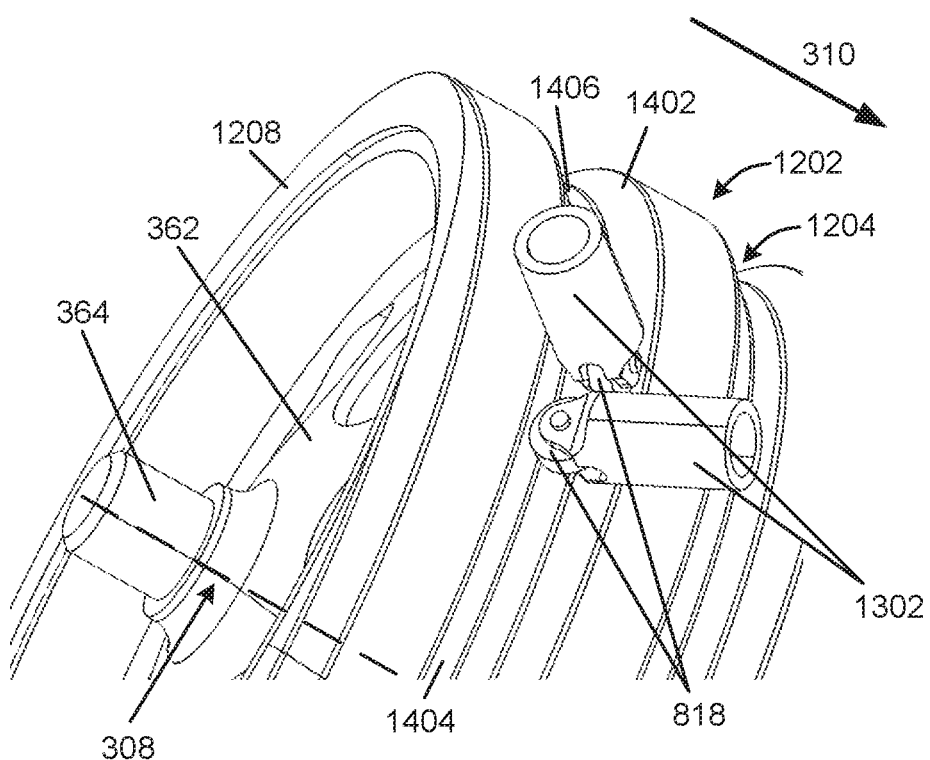
FIGS. 14A and 14B are more detailed views of the drum and wheels of the example guiding apparatus disclosed herein.
Figure 14B:
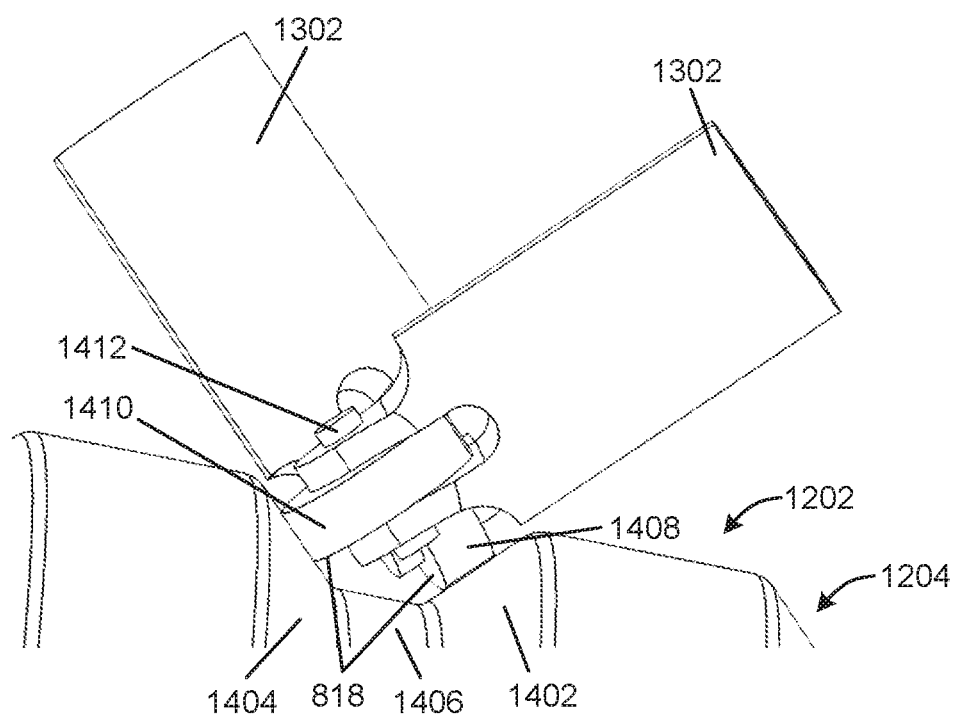

FIGS. 14A and 14B are detailed views of the interaction between an example pair of interior wheels 818 and surfaces 1402 and 1404 of the helical groove 1204. The surfaces 1402 and 1404 are positioned opposite one another and define the edges or sides of the helical groove 1204, in addition to a bottom surface 1406 of the helical groove 1204. The angle of the interior wheels 818 and casters 1302 are angled to correspond to the angles of the surfaces 1402 and 1404 such that surfaces 1408 and 1410 of the interior wheels 818 roll along the surfaces 1402 and 1404. Positioning the interior wheels 818 in pairs such that each of the wheels 818 contacts opposite respective surfaces 1402 and 1404 distributes any forces from the carriage 338 and/or the drum 306. The casters 1302 are placed within the carriage 338 perpendicular to the angle of the surfaces 1402 and 1404 to position the surfaces 1408 and 1410 wheels 818 against the surfaces 1402 and 1404 of the groove 1204. The casters 1302 are attached to the interior wheels 818 via axles 1412 in a manner that allows the wheels 818 to easily roll over any imperfections (e.g., slight changes in the groove 1204 due to machining, dirt, assembly tolerances etc.) in the groove 1404 without substantially affecting the movement of the carriage 338. For example, the casters 1302 and/or the wheels 818 may include springs or rubber portions that maintain the position of the surfaces 1408 and 1410 of the wheels 818 against the surfaces 1402 and 1404 of the groove 1204 (i.e., press the wheels 818 against the surfaces 1402 and 1404 of the groove 1204) and allow for flexibility (e.g., elastic deformation) of the wheels 818 to roll over imperfections.

Figure 15A:
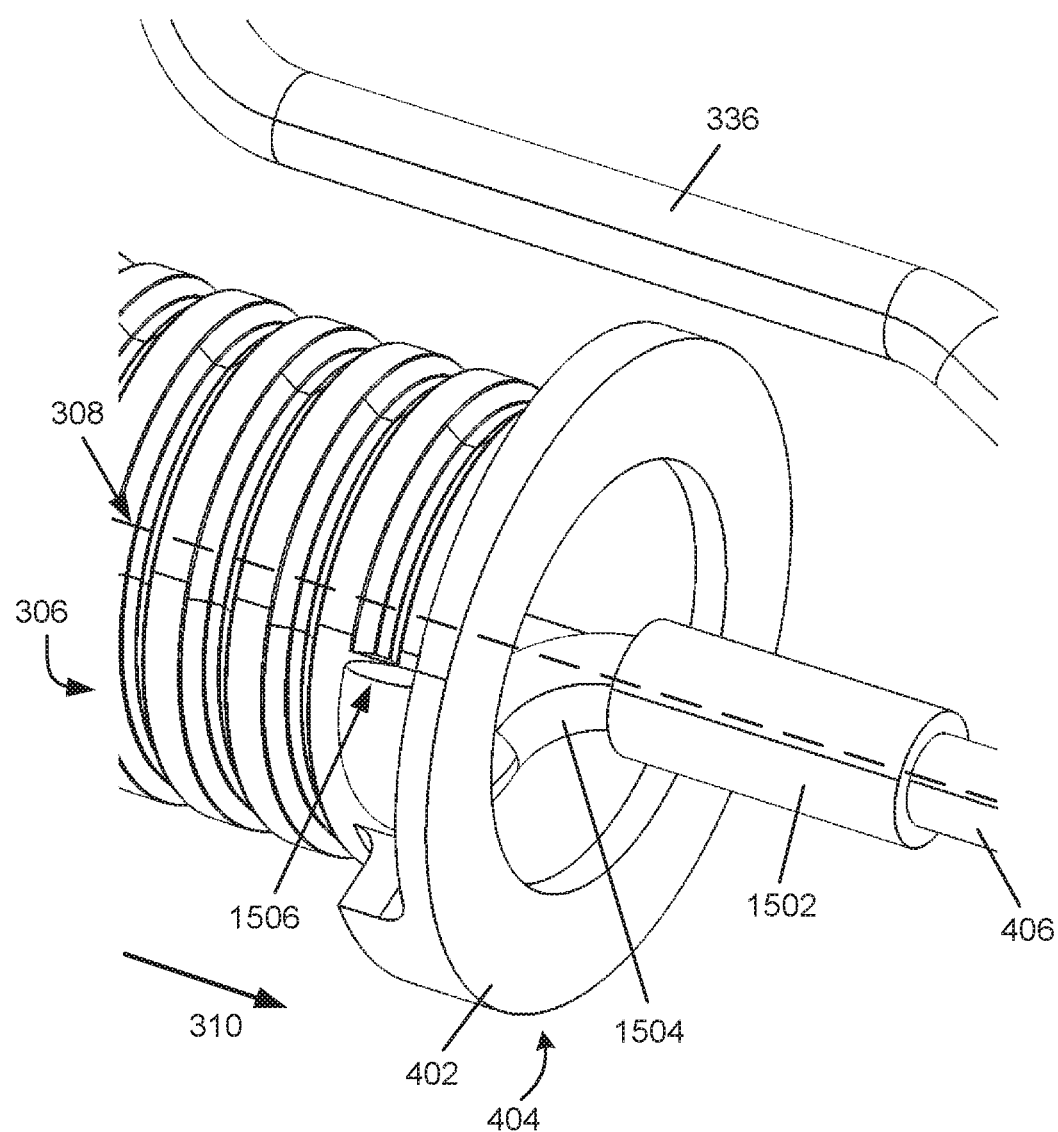
FIGS. 15A-15C depict an example coupling between the drum and a transmission and/or motor.
Figure 15C:
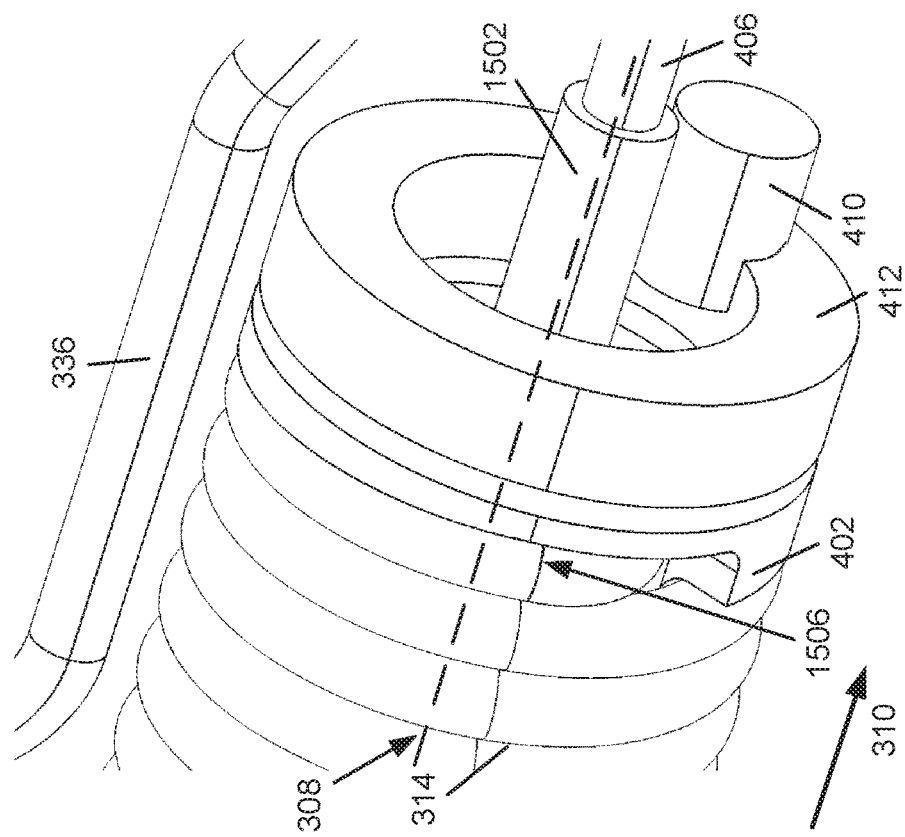
Figure 15B:
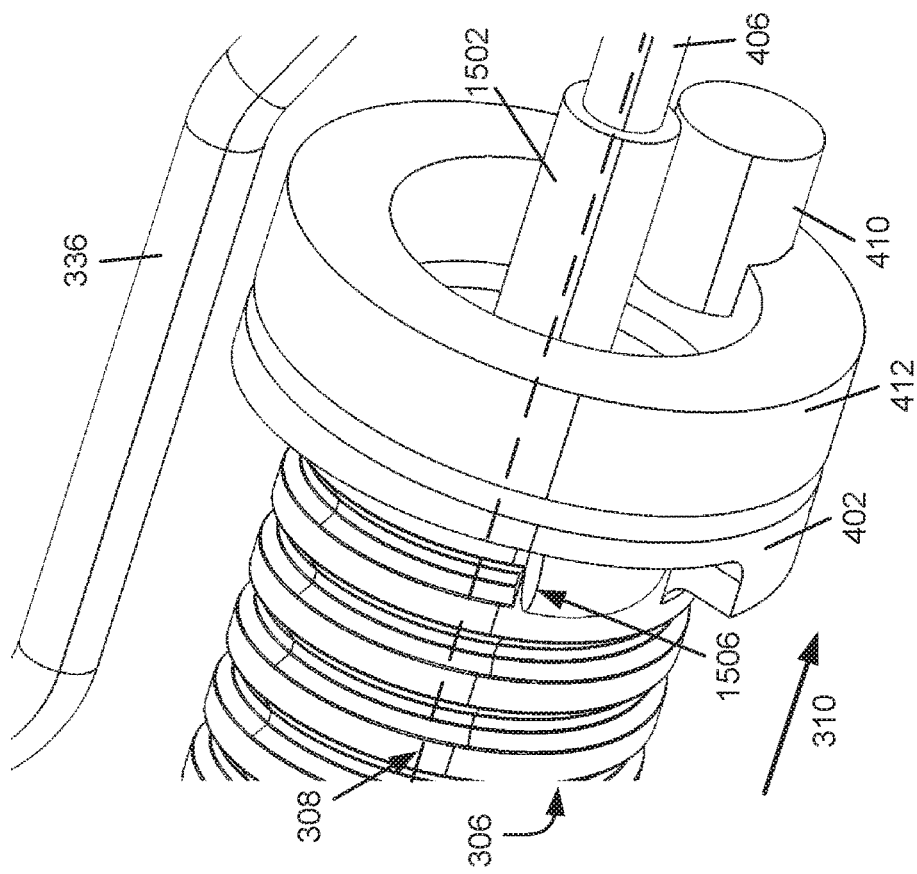

FIGS. 15A-15C depict an example coupling 1502 between the drogue hose 314 coiled around the drum 306 and the non-rotating fuel line 406. The coupling 1502 may include a sleeve-type coupling to fit over an end of the non-rotating fuel line 406 and an end of a rotating fuel line 1504. The rotating fuel line 1504 is disposed between the coupling 1502 and the drogue hose 314 via an aperture in the forward end 404 of the drum 306. The rotating fuel 1504 line is shaped to transmit fuel between an interior of the drum 306 and an exterior of the drum 306. The drogue hose 314 is attached to an exterior end 1506 of the rotating fuel line 1504. The coupling 1502 is sealed in a manner that allows relative rotation of the rotating fuel line 1504 while preventing leaks between the non-rotating fuel line 406 and the rotating fuel line 1504. In FIG. 15B, the forward end 404 of the drum 306 is depicted in detail with the motor 410 and transmission 412 attached to the first end of the drum 306. FIG. 15C depicts the drogue hose 314 attached to the exterior end of the rotating fuel line 1504 and coiled around the drum 306.

FIGS. 16A and 16B are rear views of the example refueling pod 300 disclosed herein. FIG. 16A depicts the example refueling pod 300 with the cart 322 used to coil the drogue hose 314 and FIG. 16B depicts the example refueling pod 300 with the carriage 338 used to coil the drogue hose 314. In the illustrated examples, a diameter 1602 of the drogue hose 314 is approximately 2.7 inches. A diameter 1604 of the drum 306, which is selected based on the ability of the drogue hose 314 to bend (e.g., the flexibility of the drogue hose 314), is approximately 15.4 inches. In other examples, the flexibility of the drogue hose 314 may be different and, thus, the drum diameter 1604 may be larger or smaller. Because the drogue hose 314 is coiled around the drum 306 in a single layer, the combined diameter of the drum 306 and the drogue hose 314 is approximately equivalent to the drum diameter 1604 (e.g., 15.4 inches) plus twice the diameter 1602 of the drogue hose (e.g., 2.7 inches), which is approximately 21 inches. In the illustrated example, the outer diameter 1606 of the housing 302 is approximately 25 inches. Space between the drum 306 (with the drogue hose 314 coiled around the drum) and an outer diameter of the pod 300 is dedicated for the structure of the pod 300 (i.e., any structure to maintain the shape and strength of the pod 300, any structure to which the components described herein, including the drum 306, the track 324, the guides 320, etc., are attached).

Figure 17B:
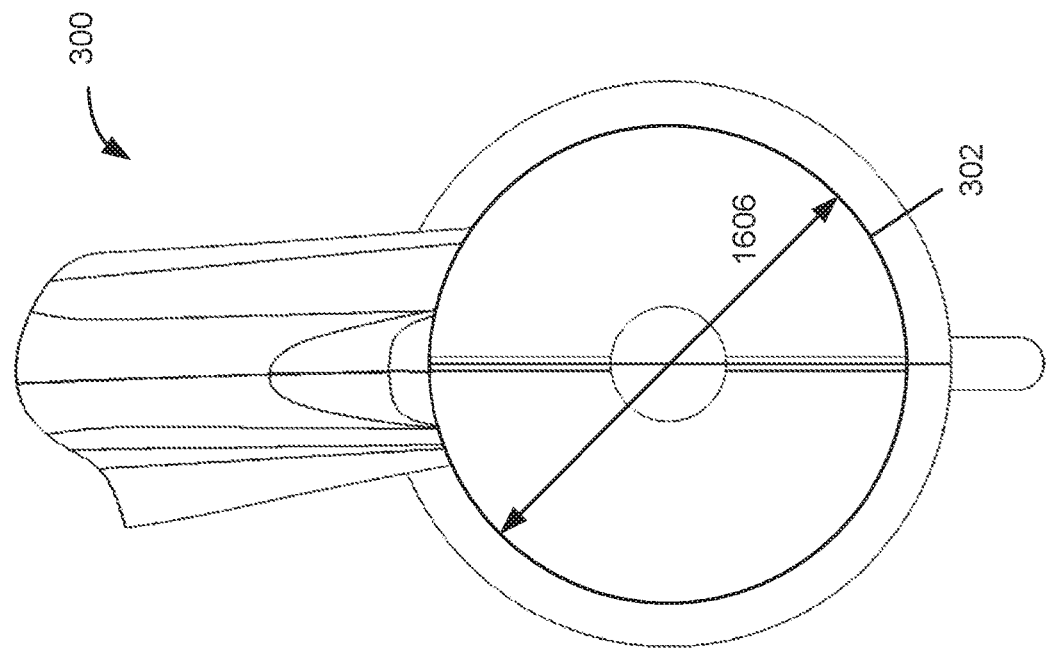
FIGS. 17A and 17B are a side-by-side comparison of front views of the known refueling pod of FIG. 2 and the example refueling pods of FIGS. 3-17 disclosed herein.
Figure 17A:
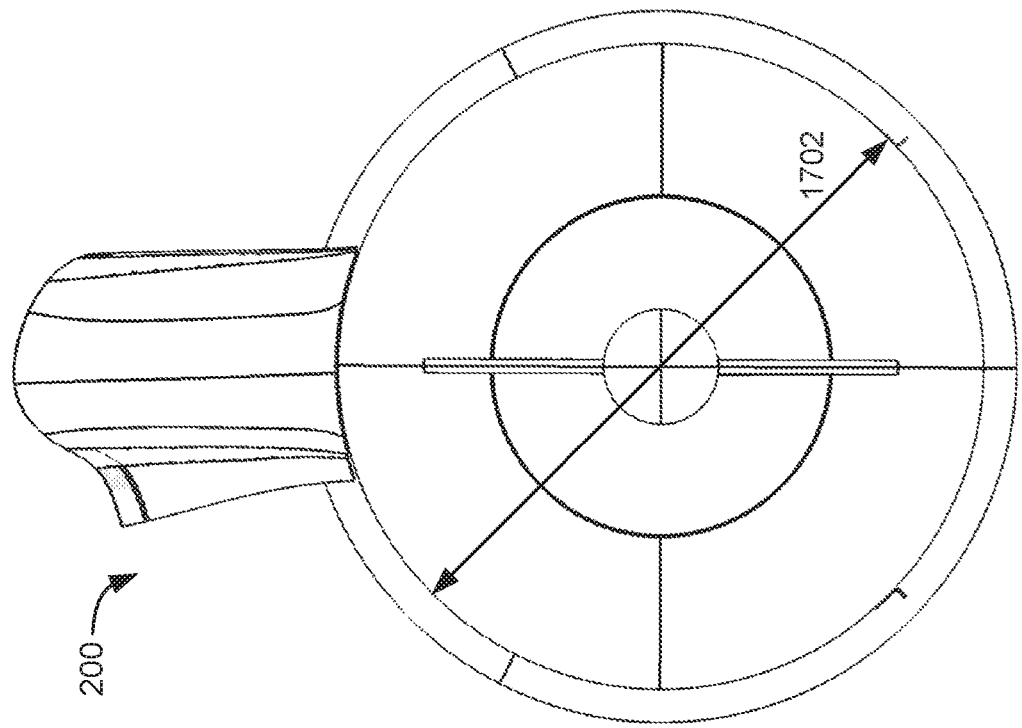

FIGS. 17A and 17B are a front view side-by-side comparison of the known refueling pod 200 of FIG. 2 and the example refueling pod 300 of FIGS. 3-12 disclosed herein and FIGS. 18A and 18B are a side view side-by-side comparison of the known refueling pod 200 and the example refueling pod 300 disclosed herein. FIGS. 17A and 17B depict the known refueling pod 200, which may have a diameter 1702 of approximately 34 inches. The example refueling pod 300, shown in FIGS. 17B and 17B, has a diameter 1606 of approximately 25 inches. The decreased diameter of the refueling pod 300 substantially reduces the effects the example refueling pod 300 has on the aerodynamic properties of the aircraft, such as the tanker aircraft 102. The decreased diameter also allows for the use of the example refueling pod 300 on smaller aircraft in a refueling operation called "buddy-buddy refueling" where, for example, one fighter jet (e.g., the fighter jet 104 acts as a tanker to supply fuel to another fighter jet (e.g., the fighter jet 106).

FIGS. 19A and 19B are a front view side-by-side comparison of the spool 208 of the known refueling pod of FIG. 2 and the drum 306 of the example refueling pod 300 of FIGS. 3-15 disclosed herein. As shown in FIG. 19A, an outline 1902 of the known refueling pod 200 having outer diameter of approximately 34 inches contains the spool 208 having dimensions including a diameter of approximately 29 inches and a width of approximately 17 inches. The dimensions of the spool 208 are constrained by a necessity to wrap (coiled in three layers) the full length of the drogue hose around the spool 206. FIG. 19B shows the example refueling pod 300 disclosed herein. A dimension 1606 of an outer diameter of approximately 25 inches is smaller than the outer diameter of the known refueling pod 200, which is approximately 34 inches. The reduction in diameter is a result of the manner in which the drogue hose 314, which has the same or a similar length (e.g., at least 70 feet) of the drogue hose 202 of FIG. 2, is coiled on the drum 306 in only one layer and the orientation of the drum being parallel to the direction of flight 310.

From the foregoing, it will be appreciated that the above disclosed apparatus and articles of manufacture are operative to reduce the aerodynamic interference due to the refueling pods and, thus, lessens adverse effects of the refueling pods on the aircraft by decreasing the overall size of the refueling pods.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a drum to rotate in a first direction to coil a hose and a second direction to uncoil the hose, the drum including a helical groove;
a carriage at least partially surrounding the drum, the carriage including rollers to guide the hose as the hose is coiled and uncoiled, the rollers including a first roller having a first axis of rotation and a second roller having a second axis of rotation, the first axis of rotation of the first roller is non-parallel relative to the second axis of rotation of the second roller, the carriage having an outer surface covering the rollers; and
wheels coupled to the carriage, the wheels to facilitate movement of the carriage along a length of the drum as the drum rotates, wherein the helical groove of the drum facilitates movement of the carriage, the wheels to follow a path of the helical groove as the drum rotates.

2. The apparatus of claim 1, wherein the wheels are positioned on an interior surface of the carriage such that a first one of the wheels engages a first edge of the groove and a second one of the wheels engages a second edge of the groove.

3. The apparatus of claim 1, wherein the rollers are aligned to coil the hose around the drum.

4. The apparatus of claim 1, wherein the rollers include a first set of rollers and a second set of rollers, the first set of rollers positioned on a first edge of a channel in the carriage, the second set of rollers positioned on a second edge of the channel.

5. An apparatus comprising:
a drum to rotate in a first direction to coil a hose and a second direction to uncoil the hose;
a carriage at least partially surrounding the drum, the carriage including rollers to guide the hose as the hose is coiled and uncoiled, the rollers including a first roller having a first axis of rotation and a second roller having a second axis of rotation, the first axis of rotation of the first roller is non-parallel relative to the second axis of rotation of the second roller, the carriage having an outer surface covering the rollers;
wheels coupled to the carriage, the wheels to facilitate movement of the carriage along a length of the drum as the drum rotates; and
exit guides to, as the hose uncoils, guide the hose away from the drum and through a drogue chute and, as the hose coils, guide the hose toward the carriage to facilitate coiling the hose around the drum.

6. The apparatus of claim 5, further comprising a track positioned parallel to an axis of the drum, the carriage coupled to the track to facilitate movement of the carriage along the length of the drum.

7. The apparatus of claim 5, wherein the carriage includes second rollers positioned on an edge of the carriage, the second rollers to tightly coil the hose around the drum.

8. An apparatus comprising:
a drum positioned in a refueling pod;
a drogue hose to be coiled around the drum when the drum is rotated in a first direction, the drogue hose to be uncoiled when the drum is rotated in a second direction; and a guide to move along a length of the drum as the drum rotates in the first and second directions, the guide forming a channel through which the drogue hose is disposed, the guide including rollers to coil the drogue hose around the drum, the rollers positioned on the guide to define a path to receive the hose, the path defining an arcuate shape between a first end of the path and a second end of the path to wrap around at least a portion of an outer surface of the drum, wherein the guide is shaped to at least partially surround the drum, the guide supported by the drum via wheels coupled to an interior of the guide, the wheels to facilitate movement of the drum relative to the guide.

9. The apparatus of claim 8, wherein the rollers include a first set of rollers and a second set of rollers, the first and second sets of rollers disposed on opposite sides of the channel to guide the hose through the channel.

10. The apparatus of claim 9, wherein the rollers further include a third set of rollers, the third set of rollers on an edge of the guide to maintain a tight coil of the drogue hose already coiled around the drum.

11. The apparatus of claim 8, further including a track adjacent the drum and the guide, the track to maintain an alignment of the guide as the drum rotates and the guide moves along the length of the drum.

12. An apparatus comprising:
a drum to be positioned in a refueling pod;
a carriage to guide a drogue hose, the carriage including a channel through which the drogue hose moves;
channel rollers disposed in the channel, the channel rollers to rotate as the drogue hose moves through the channel, the channel rollers including a first roller and a second roller, the first roller having a first face and the second roller having a second face, the first face of the first roller oriented in a first direction and the second face of the second roller oriented in a second direction relative to an outer surface of a drum, the first face oriented at an angle relative to the second face; and
first wheels disposed in apertures of the carriage, the wheels extending from an interior surface of the carriage to guide the carriage.

13. The apparatus of claim 12, further comprising edge rollers disposed on an edge of the carriage, the edge rollers to tightly coil the drogue hose.

14. The apparatus of claim 13, wherein the edge of the carriage is tapered between a first edge of the channel to a second edge of the channel, the tapered edge to correspond to a coil of the drogue hose.

15. The apparatus of claim 12, further comprising casters disposed within the apertures of the carriage, the casters coupled to the first wheels to provide flexibility for movement of the first wheels.

16. The apparatus of claim 12, further comprising a cover to cover the channel rollers disposed in the channel, the cover including portions of axles for each of the channel rollers, the portions of the axles to maintain alignment of the channel rollers.

17. The apparatus of claim 12, further comprising second wheels disposed on an exterior surface of the carriage and a track positioned adjacent the carriage, the second wheels to roll along the track as the carriage moves.

18. The apparatus of claim 12, wherein the channel has a radius of curvature greater than or equal to a bend radius of the drogue hose.

19. The apparatus of claim 1, wherein the first axis of rotation is orthogonal relative to the second axis of rotation.

* * * * *